US011974177B2

(12) United States Patent
Xu et al.

(10) Patent No.: US 11,974,177 B2
(45) Date of Patent: Apr. 30, 2024

(54) METHOD AND APPARATUS FOR SYSTEM INTERWORKING

(71) Applicant: GUANGDONG OPPO MOBILE TELECOMMUNICATIONS CORP., LTD., Dongguan (CN)

(72) Inventors: Yang Xu, Dongguan (CN); Jun Cao, Dongguan (CN); Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 378 days.

(21) Appl. No.: 17/351,543

(22) Filed: Jun. 18, 2021

(65) Prior Publication Data
US 2021/0385706 A1    Dec. 9, 2021

Related U.S. Application Data

(63) Continuation of application No. PCT/CN2019/107382, filed on Sep. 23, 2019.

(51) Int. Cl.
*H04W 36/00* (2009.01)
*H04W 60/00* (2009.01)
*H04W 76/16* (2018.01)

(52) U.S. Cl.
CPC ... *H04W 36/0069* (2018.08); *H04W 36/0022* (2013.01); *H04W 60/005* (2013.01); *H04W 76/16* (2018.02)

(58) Field of Classification Search
CPC ....... H04W 76/27; H04W 80/08; H04W 4/80; H04W 76/10; H04W 4/06; H04W 48/10; H04L 1/0003; H04B 7/18576
See application file for complete search history.

(56) References Cited

U.S. PATENT DOCUMENTS

2016/0295473 A1    10/2016  Lee et al.
2019/0082501 A1 *   3/2019  Vesely ................. H04W 92/20
(Continued)

FOREIGN PATENT DOCUMENTS

CN    102160419 A    8/2011
CN    102457924 A    5/2012
(Continued)

OTHER PUBLICATIONS

Partial supplementary European search report dated Feb. 3, 2022 received in European Patent Application No. EP19947402.4.
(Continued)

*Primary Examiner* — Iqbal Zaidi
(74) *Attorney, Agent, or Firm* — Sheppard, Mullin, Richter & Hampton LLP

(57) ABSTRACT

The present disclosure discloses a method and apparatus for system interworking, and relates to the field of wireless communication. The method includes receiving, by a terminal, dual connectivity information transmitted by a first base station in a second system, during an interworking process of handover from a first system to the second system; and establishing, by the terminal, dual connectivity with the first base station and a second base station in the second system based on the dual connectivity information. The first system is a 5G NR, and the second system is a 4G EPS.

15 Claims, 10 Drawing Sheets

(56) References Cited

U.S. PATENT DOCUMENTS

| | | | |
|---|---|---|---|
| 2020/0100153 A1* | 3/2020 | Huang | H04W 36/0079 |
| 2020/0112894 A1* | 4/2020 | Koshimizu | H04W 36/0022 |
| 2021/0385706 A1 | 12/2021 | Xu et al. | |

FOREIGN PATENT DOCUMENTS

| | | |
|---|---|---|
| CN | 102685714 A | 9/2012 |
| CN | 102932923 A | 2/2013 |
| CN | 104303590 A | 1/2015 |
| CN | 104349505 A | 2/2015 |
| CN | 105228263 A | 1/2016 |
| CN | 105917727 A | 8/2016 |
| CN | 107548095 A | 1/2018 |
| CN | 107666693 A | 2/2018 |
| CN | 108282836 A | 7/2018 |
| CN | 108353039 A | 7/2018 |
| CN | 108391322 A | 8/2018 |
| CN | 108617020 A | 10/2018 |
| CN | 108617025 A | 10/2018 |
| CN | 108696881 A | 10/2018 |
| CN | 108810962 A | 11/2018 |
| CN | 108924941 A | 11/2018 |
| CN | 109041143 A | 12/2018 |
| CN | 109068390 A | 12/2018 |
| CN | 109151921 A | 1/2019 |
| CN | 109155949 A | 1/2019 |
| CN | 109246834 A | 1/2019 |
| CN | 109391932 A | 2/2019 |
| CN | 109429217 A | 3/2019 |
| CN | 110022587 A | 7/2019 |
| CN | 110099417 A | 8/2019 |
| CN | 110100476 A | 8/2019 |
| CN | 110115098 A | 8/2019 |
| CN | 110121916 A | 8/2019 |
| CN | 110140421 A | 8/2019 |
| CN | 110267301 A | 9/2019 |
| TW | 201132200 A | 9/2011 |
| WO | 2014176982 A1 | 11/2014 |
| WO | 2019030981 A1 | 2/2019 |
| WO | 2019131851 A1 | 7/2019 |
| WO | 2019153300 A1 | 8/2019 |

OTHER PUBLICATIONS

Ericsson: "Support of NR to E-UTRA handover with dual connectivity", 3GPP Draft; R2-1910049—Support of NR to E-UTRA Handover With Dual Connect Ivity, 3rd Generation Partnership Project (3GPP),Mobile Competence Centre; 650, Route Des Lucioles; F-06921 Sophia-Antipol, vol. Ran WG2, no. Prague, Czech Republic; Aug. 26, 2019-Aug. 30, 2019 Aug. 15, 2019 (Aug. 15, 2019), XP051767834.

Qualcomm Incorporated: "Inter-system Handover between SA and NSA", 3GPP Draft; R3-186457 Inter-System Handover Between SA and NSA, 3rd Generation Partnership Project (3GPP),Mobile Competence Centre;650, Route Des Lucioles; F-06921 Sophia-Antipolis Cedex; France, vol. RAN WG3, no. Spokane, United States; Nov. 12, 2018-Nov. 16, 2018,Nov. 11, 2018 (Nov. 11, 2018),XP051558245.

Huawei et al.: "Support of direct HO from NR to EN-DC" , 3GPP Draft; R2-1907489, 3rd Generation Partnership Project (3GPP), Mobile Competence Centre; 650, Route Des Lucioles; F-06921 Sophia-Antipolis Cedex ; France, vol. RAN WG2 , no. Reno , USA; May 13, 2019-May 17, 2019 May 13, 2019 (May 13, 2019), XP051730925.

Qualcomm Incorporated:"UE Capability on handover from NR SA to EN-DC", 3GPP Draft; R2-1811137 , 3rd Generation Partnership Project (3GPP), Mobile Competence Centre; 650, Route Des Lucioles; F-06921 Sophia-Antipolis Cedex; France, vol. RAN WG2 , no. Gothenburg, Sweden;Aug. 20, 2018-Aug. 24, 2018 ,Aug. 10, 2018 (Aug. 10, 2018) , p. 1 ,XP051520829.

China Telecom: "Support of inter-system HO from SA to EN-DC in Rel-16", 3GPP Draft; R3-194510, 3rd Generation Partnership Project (3GPP), Mobile Competence Centre; 650, Route Des Lucioles; F-06921 Sophia-Antipolis Cedex; France, vol. RAN WG3, no. Ljubljana, Slovenia;Aug. 26, 2019-Aug. 30, 2019, Aug. 17, 2019 (Aug. 17, 2019),XP051770697.

Communication pursuant to Article 94(3) EPC for European application 19947402.4 dated Jan. 27, 2023.

The Second Office Action from corresponding Chinese Application No. 202110852947.5, dated Feb. 15, 2023 . English translation attached.

Grant Notice & Supplementary Search from corresponding Chinese Application No. 202110852947.5, dated Apr. 28, 2023. English translation attached.

Japanese Office Action with English Translation for JP Application 2021-536710 dated Jun. 27, 2023.

Nokia, "Discussion on securing SRBs with No. DRBs", 3GPP TSG-RAN#79 RP-180495, Mar. 22, 2018.

Samsung, "Update of default NAS messages to add ENDC IEs", 3GPP TSG RAN WG5 #2-5G-NR Adhoc R5-181871r4, Apr. 13, 2018.

3GPP, "3rd Generation Partnership Project, Technical Specification Group Services and System Aspects, System Architecture for the 5G System, Stage 2(Release 16)", 3GPP TS 23.501 V16.1.0, Jun. 30, 2019.

International Search Report and Written Opinion dated Jun. 23, 2020 in International Application No. PCT/CN2019/107382. English translation attached.

First Office Action from corresponding Chinese Application No. 2021108529475 , dated Nov. 21, 2022. English translation attached.

* cited by examiner

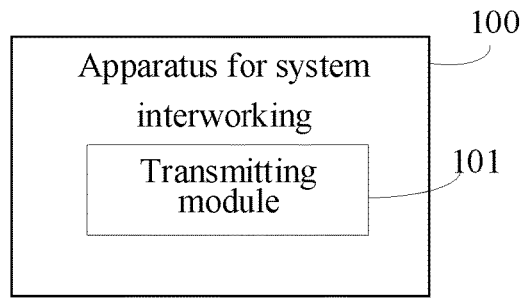
FIG. 10
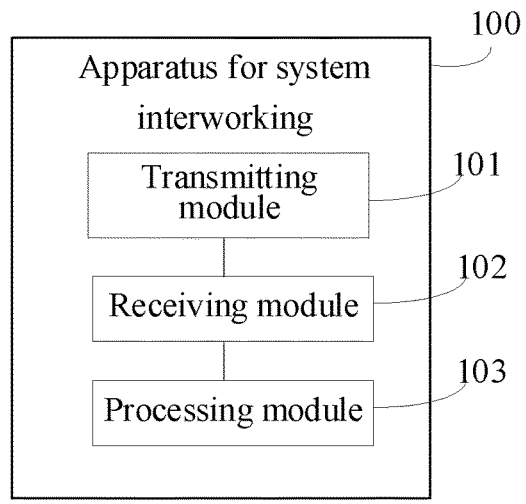
FIG. 11
FIG. 12

METHOD AND APPARATUS FOR SYSTEM INTERWORKING

CROSS-REFERENCE TO RELATED APPLICATION

The present application is a continuation of International Application No. PCT/CN2019/107382, filed on Sep. 23, 2019, the entire disclosure of which is incorporated herein by reference.

TECHNICAL FIELD

The present disclosure relates to the field of wireless communication, and specifically, to a method and apparatus for system interworking.

BACKGROUND

A 5th Generation Mobile Communication Technology (5G) system includes Standalone (SA) and Non-Standalone (NSA). The SA uses a 5G Core (5GC) network. The NSA uses an Evolved Packet Core (EPC) core network; terminals connect to New Radio (NR) on the basis of a 4th Generation Mobile Communication Technology (4G) network, and uniformly access the EPC core network.

The SA and the NSA can support different services. For example, the SA of the 5G system only supports enhanced Mobile Broadband (eMBB) services, and cannot support a voice call service which therefore still needs to be performed on a 4G system, such as an Evolved Packet System (EPS). Consequently, when a terminal registered with the 5G system performs a voice call service, the terminal needs to fall back to the EPS to perform the service. A process of the terminal falling back from the 5G system to the 4G system (such as the EPS) requires handover between systems.

When the terminal falls back from the 5G system to the 4G system, the terminal may migrate all data flows to an Evolved Universal Terrestrial Radio Access Network (E-UTRAN) base station for service transmission, which causes a heavy load on the E-UTRAN base station.

SUMMARY

Embodiments of the present disclosure provide a method and apparatus for system interworking that are capable of solving a problem in the related art that an E-UTRAN base station is heavily loaded. Technical solutions are as follows.

In an aspect, a method for system interworking is provided. The method includes: receiving, by a terminal, dual connectivity information transmitted by a first base station in a second system, during an interworking process of handover from a first system to the second system; and establishing, by the terminal, dual connectivity with the first base station and a second base station in the second system based on the dual connectivity information. The first system is a 5G NR, and the second system is a 4G EPS.

In an aspect, a method for system interworking is provided. The method includes: determining, by a first core network element in a first system or a second core network element in a second system, whether to establish dual connectivity between a first base station and a second base station in the second system and a terminal based on a dual connectivity parameter reported by the terminal. The dual connectivity parameter indicates that the terminal is capable of establishing the dual connectivity with the first base station and the second base station. The first system is a 5G NR, and the second system is a 4G EPS.

In an aspect, a terminal is provided. The terminal includes a processor and a memory. The memory stores at least one instruction configured to be executed by the processor to implement the method for system interworking according to the above method aspect performed by the terminal.

BRIEF DESCRIPTION OF DRAWINGS

In order to clearly explain technical solutions of embodiments of the present disclosure, drawings used in description of embodiments are briefly described below. Obviously, the drawings as described below are merely some embodiments of the present disclosure. Based on these drawings, other drawings can be obtained by those skilled in the art without creative effort.

FIG. 10 is a flowchart illustrating a method for system interworking according to an embodiment of the present disclosure.

FIG. 11 is a block diagram illustrating an apparatus for system interworking according to an embodiment of the present disclosure.

FIG. 12 is a block diagram illustrating another apparatus for system interworking according to an embodiment of the present disclosure.

DESCRIPTION OF EMBODIMENTS

Figures 1, 2:
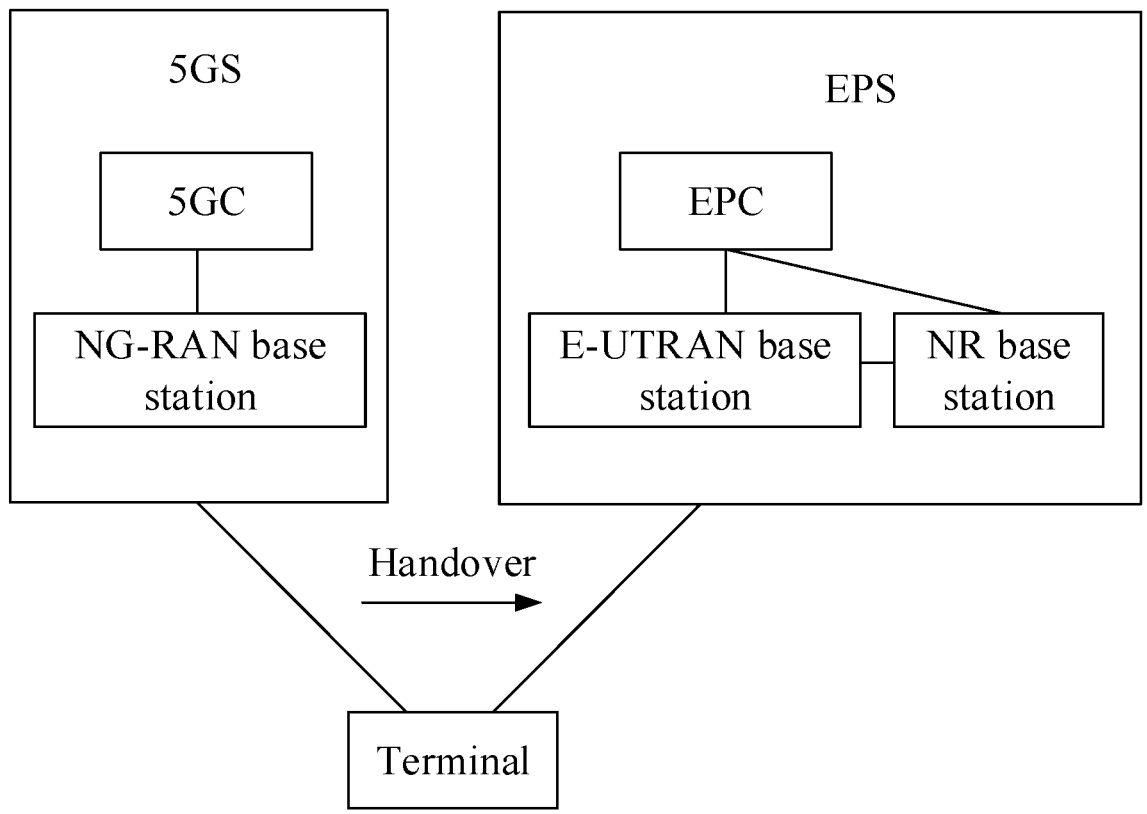
FIG. 1 is a schematic diagram illustrating an implementation environment according to an embodiment of the present disclosure.
FIG. 2 is a flowchart illustrating a method for system interworking according to an embodiment of the present disclosure.

In order to clearly explain objectives, technical solutions, and advantages of the present disclosure, embodiments of the present disclosure will be further described in detail below in combination with the accompanying drawings.

In an aspect, a method for system interworking is provided. The method includes transmitting, by a terminal, a dual connectivity parameter to a first core network element in a first system during a registration process. The dual connectivity parameter indicates that the terminal is capable of establishing dual connectivity with a first base station and a second base station in a second system.

In an embodiment, the dual connectivity parameter is used to trigger the first base station and the second base station in the second system to establish the dual connectivity with the terminal during an interworking process.

In an embodiment, the dual connectivity parameter is used along with a first parameter in subscription information of the terminal to determine to trigger the first base station and the second base station in the second system to establish the dual connectivity with the terminal during the interworking process.

In an embodiment, the first parameter in the subscription information indicates whether a terminal user is allowed to establish the dual connectivity with the first base station and the second base station in the second system.

In an embodiment, the dual connectivity parameter and the first parameter in the subscription information are used for the first system or the second system to determine whether to trigger the first base station and the second base station in the second system to establish the dual connectivity with the terminal.

In an embodiment, the dual connectivity parameter and the first parameter in the subscription information are used for the first system to generate and transmit a first indication to the second system. The first indication is used to enable the second system to determine whether to trigger the first base station and the second base station in the second system to establish the dual connectivity with the terminal.

In an embodiment, the dual connectivity parameter and the first parameter in the subscription information are used for the second system to determine whether to trigger the first base station and the second base station in the second system to establish the dual connectivity with the terminal.

In an embodiment, transmitting, by the terminal, the dual connectivity parameter to the first core network element in the first system includes: transmitting, by the terminal, a Non-Access Stratum (NAS) message to the first core network element in the first system, wherein the NAS message carries the dual connectivity parameter.

In an embodiment, the NAS message is a registration request message.

In an embodiment, the interworking process is a handover process. The method further includes: receiving, by the terminal, dual connectivity information transmitted by the first base station in the second system, during a process of handover from the first system to the second system; and establishing, by the terminal, the dual connectivity with the first base station and the second base station based on the dual connectivity information.

In an embodiment, the dual connectivity information includes a first mapping relationship and a second mapping relationship. The first mapping relationship is a correspondence between system-level bearers and Data Radio Bearers (DRBs) associated with the first base station, and the second mapping relationship is a correspondence between system-level bearers and DRBs associated with the second base station.

In an embodiment, the first system is a 5G system, and the second system is an EPS.

In an aspect, a method for system interworking is provided. The method includes: receiving, by a terminal, dual connectivity information transmitted by a first base station in a second system, during an interworking process of a first system and the second system; and establishing, by the terminal, dual connectivity with the first base station and a second base station in the second system based on the dual connectivity information.

In an embodiment, the dual connectivity information includes a first mapping relationship and a second mapping relationship. The first mapping relationship is a correspondence between system-level bearers and DRBs associated with the first base station, and the second mapping relationship is a correspondence between system-level bearers and DRBs associated with the second base station.

In an embodiment, the method further includes: transmitting, by the terminal, a dual connectivity parameter to a first core network element in the first system during a registration process. The dual connectivity parameter indicates that the terminal is capable of establishing dual connectivity with the first base station and the second base station in the second system.

In an embodiment, the dual connectivity parameter is used to trigger the first base station and the second base station in the second system to establish the dual connectivity with the terminal during the interworking process.

In an embodiment, the dual connectivity parameter is used along with a first parameter in subscription information of the terminal to determine to trigger the first base station and the second base station in the second system to establish the dual connectivity with the terminal during the interworking process.

In an embodiment, the first parameter in the subscription information indicates whether a terminal user is allowed to establish the dual connectivity with the first base station and the second base station in the second system.

In an embodiment, the dual connectivity parameter and the first parameter in the subscription information are used for the first system or the second system to determine whether to trigger the first base station and the second base station in the second system to establish the dual connectivity with the terminal.

In an embodiment, the dual connectivity parameter and the first parameter in the subscription information are used for the first system to generate and transmit a first indication to the second system. The first indication is used to enable the second system to determine whether to trigger the first base station and the second base station in the second system to establish the dual connectivity with the terminal.

In an embodiment, the dual connectivity parameter and the first parameter in the subscription information are used for the second system to determine whether to trigger the first base station and the second base station in the second system to establish the dual connectivity with the terminal.

In an embodiment, transmitting, by the terminal, the dual connectivity parameter to the first core network element in the first system includes: transmitting, by the terminal, an NAS message to the first core network element in the first system, wherein the NAS message carries the dual connectivity parameter.

In an embodiment, the NAS message is a registration request message.

In an embodiment, the interworking process is a handover process.

In an embodiment, the first system is a 5G system, and the second system is an EPS.

In an aspect, a method for system interworking is provided. The method includes: determining, by a first core network element in a first system or a second core network element in a second system, whether to establish dual connectivity between a first base station and a second base station in the second system and a terminal based on a dual connectivity parameter reported by the terminal. The dual connectivity parameter indicates that the terminal is capable of establishing the dual connectivity with the first base station and the second base station.

In an embodiment, the dual connectivity parameter is used along with a first parameter in subscription information of the terminal to determine whether to establish the dual connectivity between the first base station and the second base station in the second system and the terminal.

In an embodiment, the first core network element in the first system or the second core network element in the second system determines whether to establish the dual connectivity for the terminal at a base station of the second system during an interworking process.

In an embodiment, the interworking process is a handover process. Determining, by the first core network element in the first system, whether to establish the dual connectivity for the terminal at the base station of the second system during the handover process includes: receiving, by the first core network element, the dual connectivity parameter transmitted by the terminal, during a registration process of the terminal; and transmitting, by the first core network element, a first indication to the base station of the second system through another network element, during a process of handover of the terminal from the first system to the second system, to enable the base station of the second system to trigger the dual connectivity.

In an embodiment, the interworking process is a handover process. Determining, by the second core network element in the second system, whether to establish the dual connectivity for the terminal at the base station of the second system during the handover process includes: receiving, by the second core network element, first information transmitted by the first core network element in the first system, and transmitting, by the second core network element, the first information to the base station of the second system, during a process of handover of the terminal from the first system to the second system, to enable the base station of the second system to trigger the dual connectivity.

In an embodiment, the interworking process is the handover process. Determining, by the second core network element in the second system, whether to establish the dual connectivity for the terminal at the base station of the second system during the handover process includes: receiving, by the second core network element, the first information transmitted by the first core network element in the first system, during the process of handover of the terminal from the first system to the second system; and generating, by the second core network element, a first indication based on the first information, and transmitting, by the second core network element, the first indication to the base station of the second system, to enable the base station of the second system to trigger the dual connectivity.

In an embodiment, the first system is a 5G system, and the second system is an EPS.

In an aspect, an apparatus for system interworking is provided. The apparatus includes a transmitting module configured to transmit a dual connectivity parameter to a first core network element in a first system during a registration process. The dual connectivity parameter indicates that the terminal is capable of establishing dual connectivity with a first base station and a second base station in a second system.

In an embodiment, the dual connectivity parameter is used to trigger the first base station and the second base station in the second system to establish the dual connectivity with the terminal during an interworking process.

In an embodiment, the dual connectivity parameter is used along with a first parameter in subscription information of the terminal to determine to trigger the first base station and the second base station in the second system to establish the dual connectivity with the terminal during the interworking process.

In an embodiment, the first parameter in the subscription information indicates whether a terminal user is allowed to establish the dual connectivity with the first base station and the second base station in the second system.

In an embodiment, the dual connectivity parameter and the first parameter in the subscription information are used for the first system or the second system to determine whether to trigger the first base station and the second base station in the second system to establish the dual connectivity with the terminal.

In an embodiment, the dual connectivity parameter and the first parameter in the subscription information are used for the first system to generate and transmit a first indication to the second system. The first indication is used to enable the second system to determine whether to trigger the first base station and the second base station in the second system to establish the dual connectivity with the terminal.

In an embodiment, the dual connectivity parameter and the first parameter in the subscription information are used for the second system to determine whether to trigger the first base station and the second base station in the second system to establish the dual connectivity with the terminal.

In an embodiment, the transmitting module is configured to transmit an NAS message to the first core network element in the first system, and the NAS message carries the dual connectivity parameter.

In an embodiment, the NAS message is a registration request message.

In an embodiment, the interworking process is a handover process. The apparatus further includes a receiving module and a processing module. The receiving module is configured to receive dual connectivity information transmitted by the first base station in the second system, during a process of handover from the first system to the second system. The processing module is configured to establish the dual connectivity with the first base station and the second base station based on the dual connectivity information.

In an embodiment, the dual connectivity information includes a first mapping relationship and a second mapping relationship. The first mapping relationship is a correspondence between system-level bearers and DRBs associated with the first base station, and the second mapping relationship is a correspondence between system-level bearers and DRBs associated with the second base station.

In an embodiment, the first system is a 5G system, and the second system is an EPS.

In an aspect, an apparatus for system interworking is provided. The apparatus includes a receiving module and a processing module. The receiving module is configured to receive dual connectivity information transmitted by a first base station in a second system, during an interworking process of a first system and the second system. The processing module is configured to establish dual connectivity with the first base station and a second base station in the second system based on the dual connectivity information.

In an embodiment, the dual connectivity information includes a first mapping relationship and a second mapping relationship. The first mapping relationship is a correspondence between system-level bearers and DRBs associated with the first base station, and the second mapping relationship is a correspondence between system-level bearers and DRBs associated with the second base station.

In an embodiment, the apparatus further includes a transmitting module configured to transmit a dual connectivity parameter to a first core network element in the first system during a registration process. The dual connectivity parameter indicates that a terminal is capable of establishing dual connectivity with the first base station and the second base station in the second system.

In an embodiment, the dual connectivity parameter is used to trigger the first base station and the second base station in the second system to establish the dual connectivity with the terminal during the interworking process.

In an embodiment, the dual connectivity parameter is used along with a first parameter in subscription information of the terminal to determine to trigger the first base station and the second base station in the second system to establish the dual connectivity with the terminal during the interworking process.

In an embodiment, the first parameter in the subscription information indicates whether a terminal user is allowed to establish the dual connectivity with the first base station and the second base station in the second system.

In an embodiment, the dual connectivity parameter and the first parameter in the subscription information are used for the first system or the second system to determine whether to trigger the first base station and the second base station in the second system to establish the dual connectivity with the terminal.

In an embodiment, the dual connectivity parameter and the first parameter in the subscription information are used for the first system to generate and transmit a first indication to the second system. The first indication is used to enable the second system to determine whether to trigger the first base station and the second base station in the second system to establish the dual connectivity with the terminal.

In an embodiment, the dual connectivity parameter and the first parameter in the subscription information are used for the second system to determine whether to trigger the first base station and the second base station in the second system to establish the dual connectivity with the terminal.

In an embodiment, the transmitting module is configured to transmit an NAS message to the first core network element in the first system, and the NAS message carries the dual connectivity parameter.

In an embodiment, the NAS message is a registration request message.

In an embodiment, the interworking process is a handover process.

In an embodiment, the first system is a 5G system, and the second system is an EPS.

In an aspect, an apparatus for system interworking is provided, which is applied to a first core network element in a first system or a second core network element in a second system. The apparatus includes a processing module configured to determine whether to establish dual connectivity between a first base station and a second base station in the second system and a terminal based on a dual connectivity parameter reported by the terminal. The dual connectivity parameter indicates that the terminal is capable of establishing the dual connectivity with the first base station and the second base station.

In an embodiment, the dual connectivity parameter is used along with a first parameter in subscription information of the terminal to determine whether to establish the dual connectivity between the first base station and the second base station in the second system and the terminal.

In an embodiment, the processing module is configured to determine whether to establish the dual connectivity for the terminal at a base station of the second system during an interworking process.

In an embodiment, the interworking process is a handover process. The apparatus is applied to the first core network element. The processing module is configured to: receive the dual connectivity parameter transmitted by the terminal, during a registration process of the terminal; and transmit a first indication to the base station of the second system through another network element, during a process of handover of the terminal from the first system to the second system, to enable the base station of the second system to trigger the dual connectivity.

In an embodiment, the interworking process is a handover process. The apparatus is applied to the second core network element. The processing module is configured to: receive first information transmitted by the first core network element in the first system, and transmit the first information to the base station of the second system, during a process of handover of the terminal from the first system to the second system, to enable the base station of the second system to trigger the dual connectivity.

In an embodiment, the interworking process is the handover process. The apparatus is applied to the second core network element. The processing module is configured to: receive the first information transmitted by the first core network element in the first system, during the process of handover of the terminal from the first system to the second system; and generate a first indication based on the first information, and transmit the first indication to the base station of the second system, to enable the base station of the second system to trigger the dual connectivity.

In an embodiment, the first system is a 5G system, and the second system is an EPS.

In an aspect, a terminal is provided. The terminal includes a processor and a memory. The memory stores at least one instruction configured to be executed by the processor to implement the method for system interworking according to any one of the above method embodiments.

In an aspect, a network-side device is provided. The network-side device includes a processor and a memory. The memory stores at least one instruction configured to be executed by the processor to implement the method for system interworking according to any one of the above method embodiments.

In an aspect, a computer-readable storage medium is provided. The computer-readable storage medium stores at least one instruction configured to be executed by a processor to implement the method for system interworking according to any one of the above method embodiments.

In an aspect, a chip is provided. The chip includes a programmable logic circuit and/or a program instruction configured to implement the method for system interworking according to any one of the above method embodiments when the chip is operating.

FIG. 1 is a schematic diagram illustrating an implementation environment according to an embodiment of the present disclosure. The implementation environment includes a first system, a second system, and a terminal. The terminal may be User Equipment (UE). Both the first system and the second system are communication systems. FIG. 1 illustrates a case where the first system is a 5G System (5GS) and the second system is an Evolved Packet System (EPS). Of course, in other possible embodiments of the present disclosure, the first system may be the EPS and the second system may be the 5GS. Embodiments of the present disclosure are not limiting in this regard.

The 5GS includes a 5GC network and a 5G Next Generation Radio Access Network (NG-RAN) base station. Core network elements in the 5GC include an Access and Mobility Management Function (AMF) network element (not illustrated in FIG. 1). The EPS includes an EPC, an NR base station, and an E-UTRAN base station. Both the NR base station and the E-UTRAN are connected to the EPC. A second core network element in the EPC includes a Mobility Management Entity (MME) function network element. Of course, both the EPS and the 5GS may also include other core network elements (not illustrated in FIG. 1). For example, the EPS may also include a Serving GateWay (SGW) and a User Port Function (UPF) network element, and an integrated network element Packet Data Network Gateway-Control+Session Management Function (PGW-C+ SMF). The 5GS may also include a session management (Unified Data Management (UDM)) network element.

A first base station and a second base station are provided in the second system. In an embodiment of the present disclosure, description is given by taking, as an example, a case where the first base station is a Master Node (MN) base station, the second base station is a Secondary Node (SN) base station, the MN base station is the E-UTRAN base station, and the SN base station is the NR base station.

In addition, system interworking includes system handover and redirection. A method for system interworking according to an embodiment of the present disclosure is aimed at a method for handover between different systems of a terminal in a connected state. In an embodiment of the present disclosure, Dual Connectivity (DC) refers to DC between the E-UTRAN and the NR, that is, E-UTRA-NR Dual Connectivity, or EN-DC for short.

In the following embodiments of the present disclosure, description is made by taking the first system being the 5GS and the second system being the EPS as an example. FIG. 2 is a flowchart illustrating a method for system interworking according to an embodiment of the present disclosure. The method includes the following operation.

At block 201, a terminal transmits a dual connectivity parameter to a first core network element in a first system during a registration process. The dual connectivity parameter indicates that the terminal is capable of establishing dual connectivity with a first base station and a second base station in a second system.

In summary, with the method for the system interworking according to the embodiment of the present disclosure, the terminal transmits the dual connectivity parameter to the first core network element in the first system during the registration process. In this way, data flows on the terminal can be distributed, upon handover between systems, to the MN base station and the SN base station in the second system for transmission, thereby solving a problem in the related art that one base station in the second system is heavily loaded.

In at least one embodiment, the dual connectivity parameter may be used to trigger the first base station and the second base station in the second system to establish the dual connectivity with the terminal during an interworking process. Correspondingly, the dual connectivity parameter may be used along with a first parameter in subscription information of the terminal to determine to trigger the first base station and the second base station in the second system to establish the dual connectivity with the terminal during the interworking process. In at least one embodiment, the interworking process is a handover process. The method for the system interworking described below is mainly described for triggering the first base station and the second base station in the second system to establish the dual connectivity with the terminal during the handover process.

Figure 3:
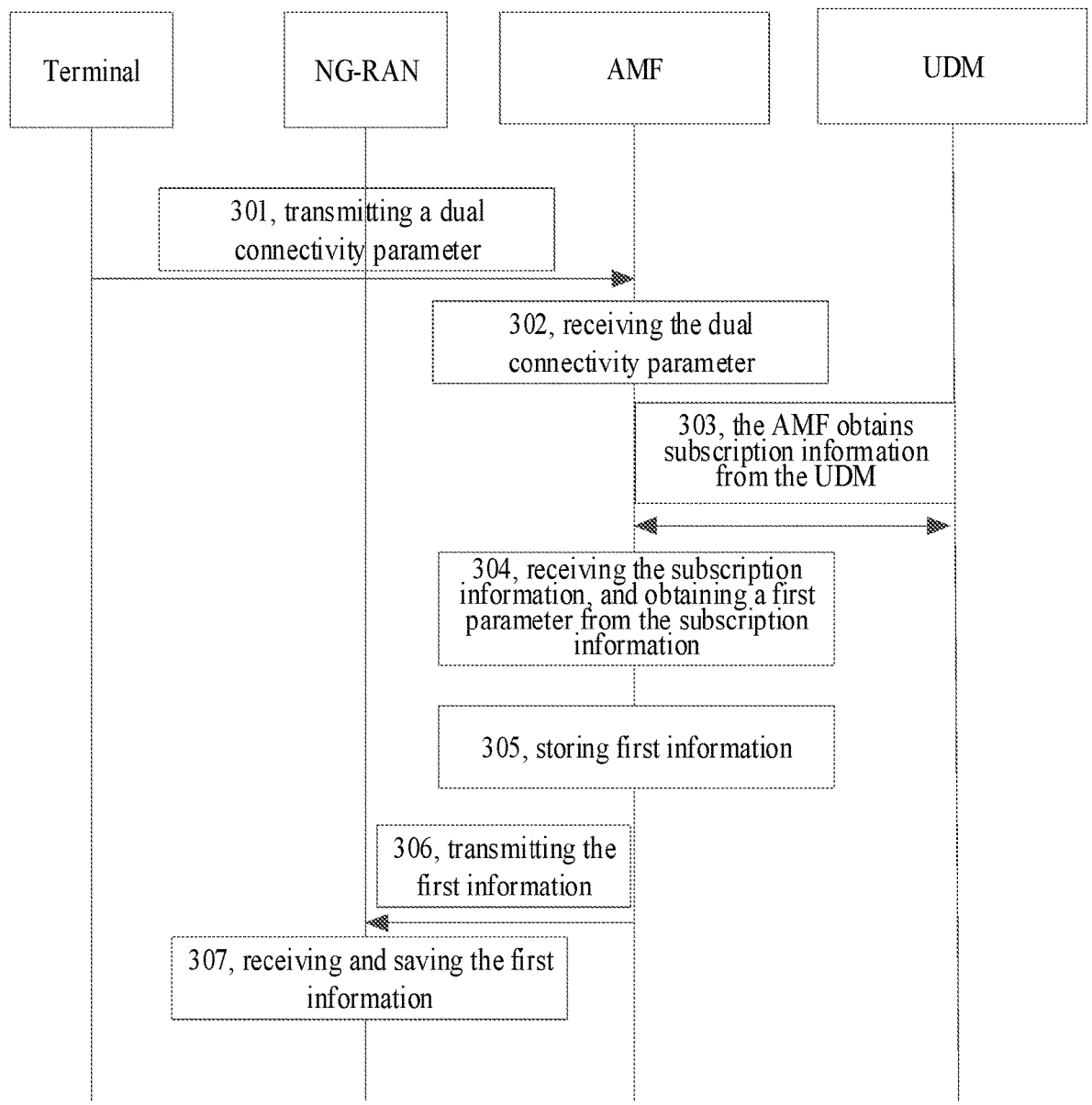
FIG. 3 is a flowchart illustrating a method for system interworking according to an embodiment of the present disclosure.
Figure 4:
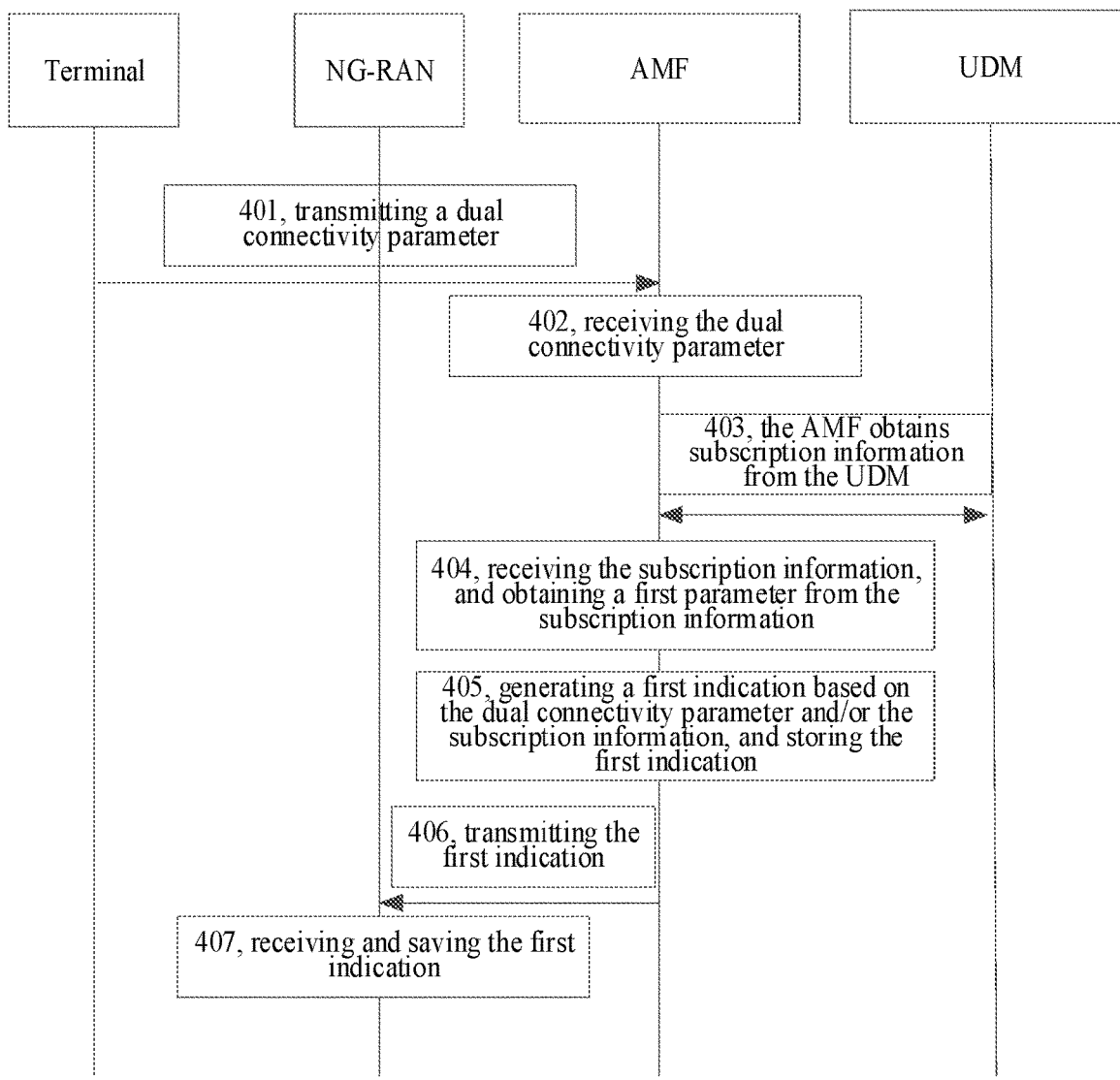
FIG. 4 is a flowchart illustrating another method for system interworking according to an embodiment of the present disclosure.

In an embodiment of the present disclosure, the dual connectivity parameter and the first parameter in the subscription information can be used for the first system or the second system to determine whether to trigger the first base station and the second base station in the second system to establish the dual connectivity with the terminal. The following provides two methods for system interworking. FIG. 3 illustrates one of the methods, where the dual connectivity parameter and the first parameter in the subscription information are used for the second system to determine whether to trigger the first base station and the second base station in the second system to establish the dual connectivity with the terminal. FIG. 4 illustrates the other of the methods, where the dual connectivity parameter and the first parameter in the subscription information are used for the first system to determine whether to trigger the first base station and the second base station in the second system to establish the dual connectivity with the terminal.

FIG. 3 is a flowchart illustrating a method for system interworking according to an embodiment of the present disclosure. The method may be applied to the 5GS and the terminal in the implementation environment illustrated in FIG. 1. The method describes a related process regarding registering the terminal in the first system in the method for the system interworking. The method includes the following operations.

At block 301, the terminal transmits the dual connectivity parameter to the AMF.

The dual connectivity parameter indicates that the terminal is capable of establishing the dual connectivity with the MN (i.e., the E-UTRAN base station) and the SN (the NR base station) in the second system, and is used to trigger the E-UTRAN base station and the NR base station to establish the dual connectivity with the terminal during the handover process. The dual connectivity parameter may be used to inform the MME network element whether the terminal supports the NR base station to be used as a secondary Radio Access Technology (RAT) or a second access node for accessing so as to implement the dual connectivity.

The dual connectivity parameter may be carried in a Non-Access Stratum (NAS) message and transmitted by the terminal to the AMF. The NAS message may be a Registration Request message. The dual connectivity parameter may be a Dual Connectivity with New Radio (DCNR) indication.

At block 302, the AMF receives the dual connectivity parameter.

For the related description of the dual connectivity parameter, reference may be made to block 301, and thus details thereof will be omitted here.

At block 303, the AMF obtains the subscription information from the UDM.

At block 304, the AMF receives the subscription information, and obtains the first parameter from the subscription information.

The subscription information obtained by the AMF from the UDM includes a number of subscription information parameters. The AMF may obtain a subscription information parameter related to the dual connectivity, that is, the first parameter, from the number of subscription information parameters. The first parameter in the subscription information may indicate whether a terminal user is allowed to use the NR or whether to allow the use of the dual connectivity. The dual connectivity parameter may be used along with the first parameter in the subscription information of the terminal to determine to trigger the E-UTRAN base station and the NR base station to establish the dual connectivity with the terminal during the handover process.

The first parameter in the subscription information indicates whether the terminal user is allowed to establish the dual connectivity with the E-UTRAN base station and the NR base station. The terminal user refers to an identifier of a user who uses the terminal (such as a user indicated by a Subscription Permanent Identifier (SUPI) or an International Mobile Subscriber Identity (IMSI)). The terminal can be a mobile terminal. Consequently, the dual connectivity parameter may characterize capability of the terminal. The first parameter may be an indication of whether the terminal user is allowed to perform the dual connectivity.

In an embodiment of the present disclosure, the AMF may store the received dual connectivity parameter and/or the received first parameter in the subscription information as first information. In addition, the first information may further include a local configuration.

At block 305, the AMF stores the first information.

According to block 304, the first information may include the dual connectivity parameter, or the first information may include the dual connectivity parameter and the first parameter in the subscription information, or the first information may include the first parameter in the subscription information, or the first information may include the dual connectivity parameter, the first parameter in the subscription information, and the local configuration, and so on. During a process of handover of the terminal from the 5GS to the EPS, the first information is transmitted by the AMF to the E-UTRAN base station through another network element.

At block 306, the AMF transmits the first information to the NG-RAN base station.

In at least one embodiment, the first information transmitted by the AMF to the NG-RAN may carry a Registration Accept message. In an embodiment of the present disclosure, since the handover is from the 5GS to the EPS, the NG-RAN base station in the 5GS can be referred to as an original base station, and the E-UTRAN base station in the EPS can be referred to as a target base station.

At block 307, the NG-RAN receives and saves the first information.

It is to be noted that the above operations at block 305 and block 306 can be performed alternatively. That is, the first information may be stored in the AMF or stored in the NG-RAN. In addition, the above embodiment describes only one of methods for system interworking. In an actual implementation of an embodiment of the present disclosure, adjustment may be made according to practical requirements. For example, the above operation at block 303 may be performed first, and then the operation at block 301 may be performed, or the operations at block 301 and block 303 may performed simultaneously. For example, the above operations at block 302 and block 303 may be performed simultaneously, or the operation at block 303 may be performed first, and then the operation at block 302 may be performed. Embodiments of the present disclosure are not limiting in this regard.

FIG. 4 is a flowchart illustrating another method for system interworking according to an embodiment of the present disclosure. The method may be applied to the 5GS and the terminal in the implementation environment illustrated in FIG. 1. The method describes a related process regarding registering the terminal in the first system in the method for the system interworking. The method includes the following operations.

At block 401, the terminal transmits the dual connectivity parameter to the AMF.

For the related description of the dual connectivity parameter, reference may be made to block 301, and thus details thereof will be omitted here.

At block 402, the AMF receives the dual connectivity parameter.

For the related description of the dual connectivity parameter, reference may be made to block 301, and thus details thereof will be omitted here.

At block 403, the AMF obtains the subscription information from the UDM.

At block 404, the AMF receives the subscription information, and obtains the first parameter from the subscription information.

For the related description of the subscription information, reference may be made to block 304, and thus details thereof will be omitted here.

At block 405, the AMF generates a first indication based on the dual connectivity parameter and/or the subscription information, and stores the first indication.

The first indication indicates that an access network of a specific system allows or requires a base station of the access network to trigger the dual connectivity.

In at least one embodiment, the AMF generates the first indication based on the dual connectivity parameter, or the AMF generates the first indication based on the dual connectivity parameter and/or the subscription information, or the AMF generates the first indication based on the dual connectivity parameter, the subscription information, and the local configuration, and so on. During the process of handover of the terminal from the 5GS to the EPS, the first indication may be transmitted by the AMF to the E-UTRAN base station through another network element.

At block 406, the AMF transmits the first indication to the NG-RAN.

In at least one embodiment, the first indication transmitted by the AMF to the NG-RAN may carry a Registration Accept message.

At block 407, the NG-RAN receives and saves the first indication.

It is to be noted that the above operations at block 405 and block 406 can be performed alternatively. That is, the first indication may be stored in the AMF or stored in the NG-RAN. In addition, the above embodiment describes only one of methods for system interworking. In an actual implementation of an embodiment of the present disclosure, adjustment may be made according to practical requirements. For example, the above operation at block 403 may be performed first, and then the operation at block 401 may be performed, or the operations at block 401 and block 403 may be performed simultaneously. For example, the above operations at block 402 and block 403 may be performed simultaneously, or the operation at block 403 may be performed first, and then the operation at block 402 may be performed. Embodiments of the present disclosure are not limiting in this regard.

In summary, with the method for the system interworking according to the embodiment of the present disclosure, the terminal transmits the dual connectivity parameter to the first core network element in the first system during the registration process. In this way, data flows on the terminal can be distributed, upon handover between systems, to the MN base station and the SN base station in the second system for transmission, thereby solving a problem in the related art that one base station in the second system is heavily loaded.

It is to be noted that during the process of registering the terminal in the 5GS, a DCNR indication reported by the terminal to the AMF can not only be applied to a scenario of the handover from the 5GS to the EPS, but also be applied to other scenarios. For example, the AMF determines whether to issue a voice support indication to the terminal based on the reported DCNR indication.

Figure 5:
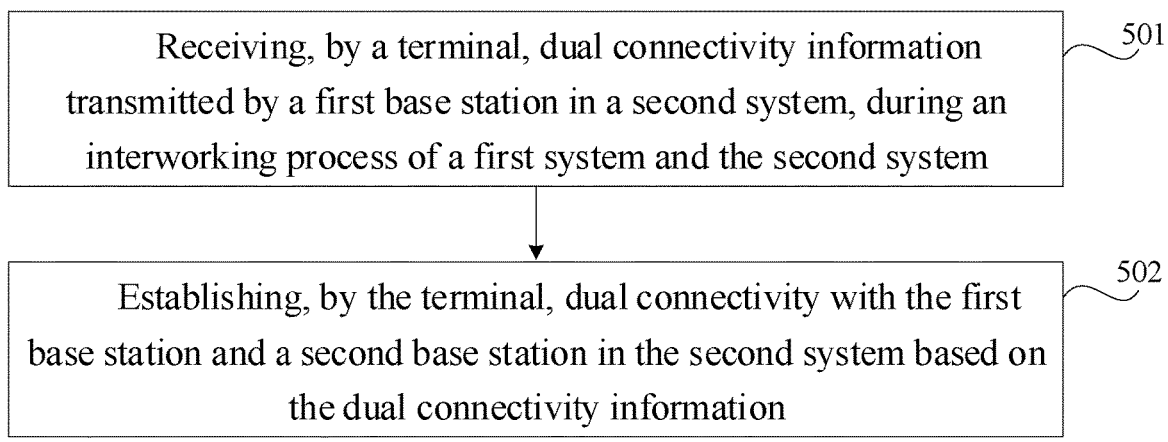
FIG. 5 is a flowchart illustrating another method for system interworking according to an embodiment of the present disclosure.

FIG. 5 is a flowchart illustrating another method for system interworking according to an embodiment of the present disclosure. The method includes the following operations.

At block 501, the terminal receives the dual connectivity information transmitted by the first base station in the second system during a process of interworking of the first system and the second system.

For example, during a process of handover from the first system to the second system, the terminal receives the dual connectivity information transmitted by the first base station in the second system. The dual connectivity information may be generated based on the dual connectivity parameter of the terminal. The dual connectivity parameter indicates that the terminal registered in the first system is capable of establishing the dual connectivity with the first base station and the second base station.

At block 502, the terminal establishes the dual connectivity with the first base station and the second base station in the second system based on the dual connectivity information.

In summary, with the method for the system interworking according to the embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

Figure 6:
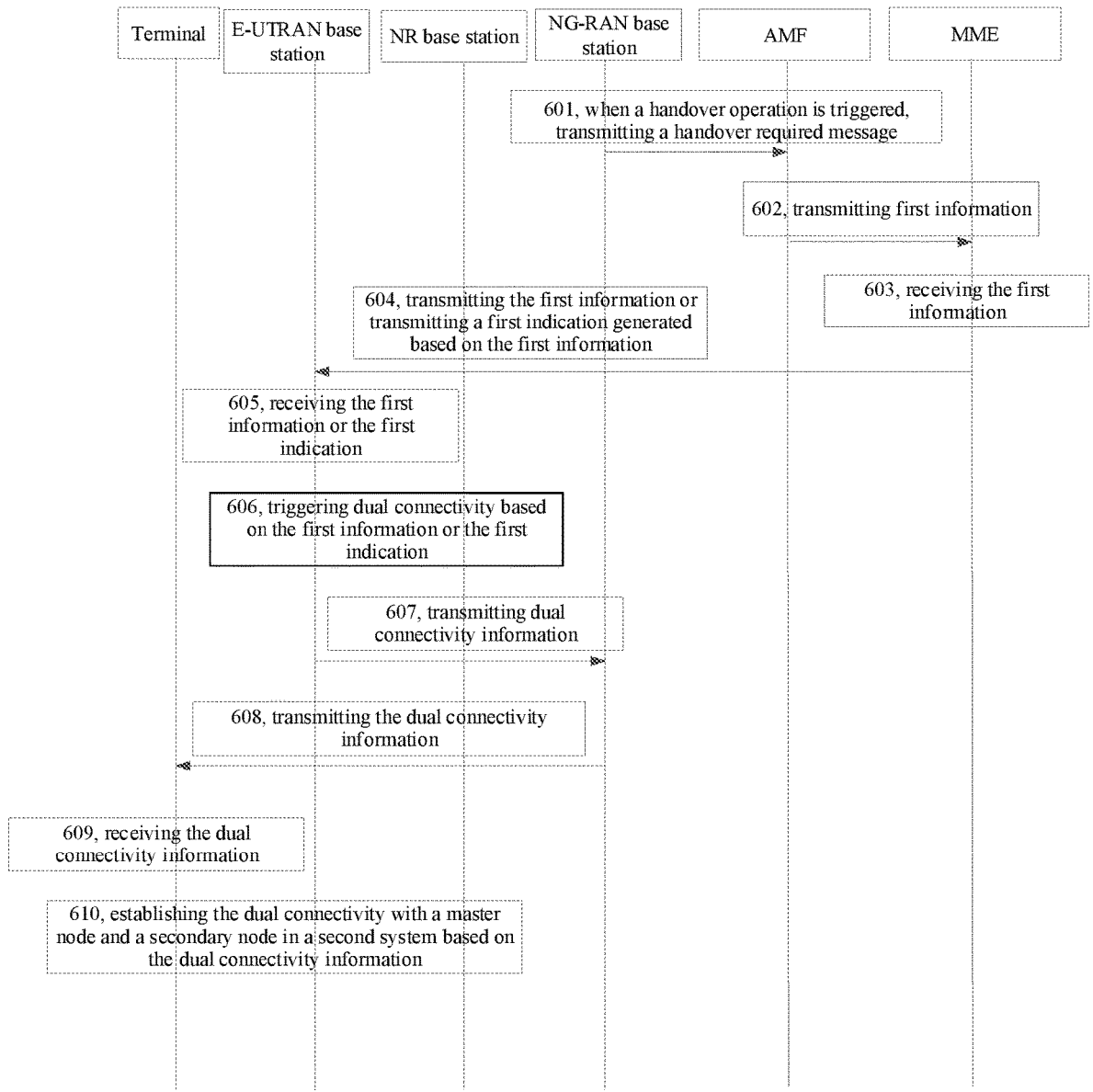
FIG. 6 is a flowchart illustrating another method for system interworking according to an embodiment of the present disclosure.
Figure 8:
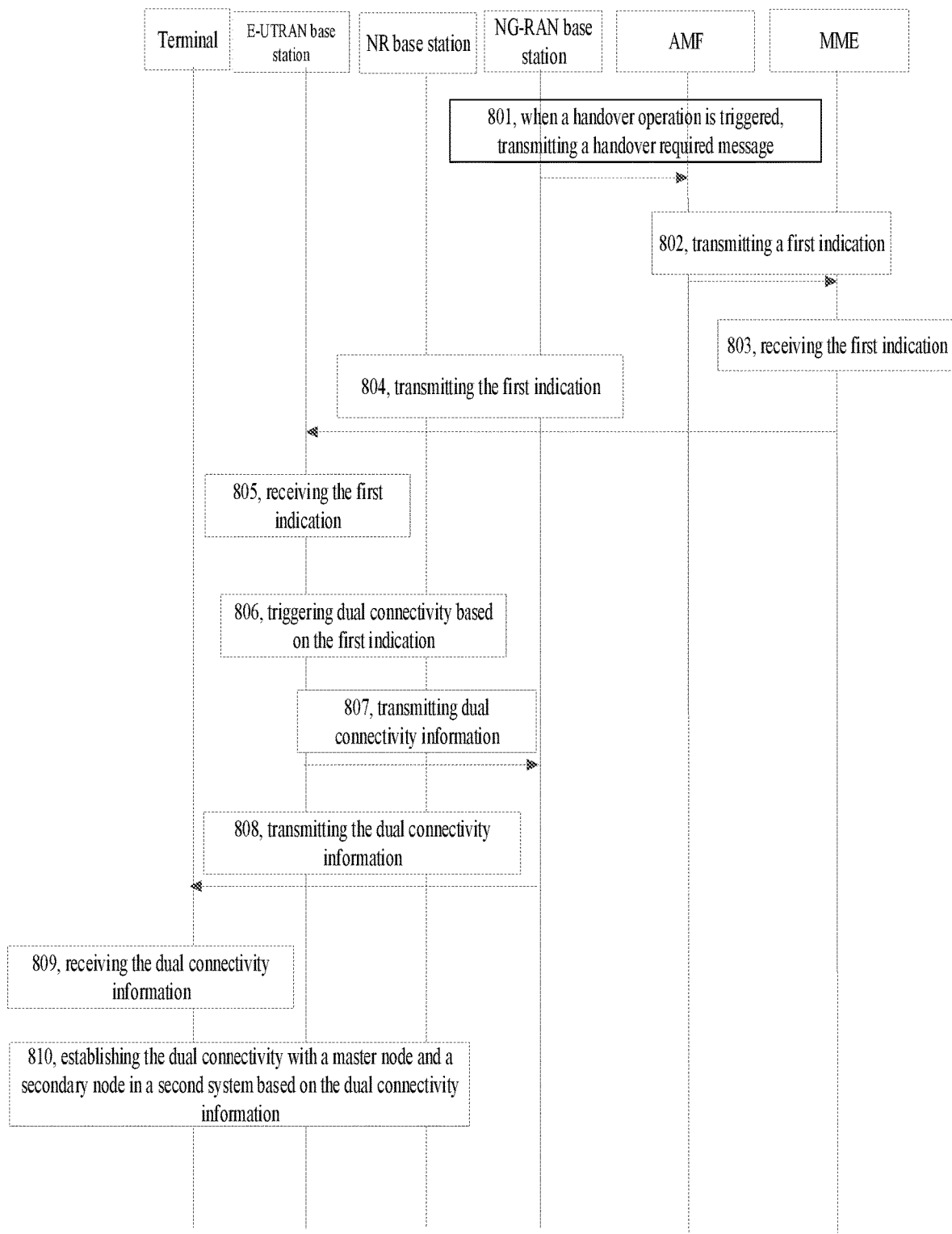
FIG. 8 is a flowchart illustrating a method for system interworking according to an embodiment of the present disclosure.

Similar to the above case, the following also provides two methods for system interworking. FIG. 6 illustrates one of the methods, where the dual connectivity parameter and the first parameter in the subscription information are used for the second system to determine whether to trigger the first base station and the second base station in the second system to establish the dual connectivity with the terminal. This corresponds to the embodiment illustrated in FIG. 3. FIG. 8 illustrates the other of the methods, where the dual connec-tivity parameter and the first parameter in the subscription information are used for the first system to determine whether to trigger the first base station and the second base station in the second system to establish the dual connectivity with the terminal. This corresponds to the embodiment illustrated in FIG. 4.

FIG. 6 is a flowchart illustrating another method for system handover according to an embodiment of the present disclosure. The method may be applied to the 5GS, the EPS, and the terminal in the implementation environment illustrated in FIG. 1. The method describes a process regarding handover of the terminal from the first system to the second system in the method for the system interworking. The method includes the following operations.

At block 601, when a handover operation is triggered, the NG-RAN base station transmits a Handover required message to the AMF.

When the handover operation is triggered, the terminal starts to perform the handover operation from the first system to the second system. In at least one embodiment, it may be determined whether to trigger the handover operation based on a measurement result. For example, the measurement result may be that the terminal moves out of a current cell, and the like.

At block 602, the AMF transmits the first information to the MME.

In the process of handover of the terminal from the first system to the second system, the AMF transmits the first information to the MME. The MME may be configured to forward the first information to the E-UTRAN base station. The first information may be transmitted by the AMF to the MME through a Relocation request.

At block 603, the MME receives the first information transmitted by the AMF.

For the related description of the first information, reference may be made to the above block 305, and thus details thereof will be omitted here.

At block 604, the MME generates the first indication based on the first information and transmits the first indication to the E-UTRAN base station, or the MME transmits the first information to the E-UTRAN base station.

The MME may generate the first indication corresponding to the first information based on the first information, and transmit the first indication to the E-UTRAN base station. The MME may determine, based on the first information, whether to generate and transmit the first indication to the E-UTRAN base station, or may transmit the first information to the E-UTRAN base station. In at least one embodiment, the MME may also determine, based on the first information and with reference to other information such as the local configuration, whether to generate and transmit the first indication to the E-UTRAN base station, or the MME may transmit the first information to the E-UTRAN base station. The first information may be transmitted by the MME to the E-UTRAN base station through a Handover request.

In at least one embodiment, the first indication may be an indication of NR restriction in EPS as secondary RAT. The first indication may be transmitted to the E-UTRAN base station as a sub-parameter of a Handover Restriction List (HRL). That is, the MME can reuse the NR restriction in EPS as secondary RAT indication as the first indication without generating a new parameter, thereby reducing system overhead.

At block 605, the E-UTRAN base station receives the first indication or the first information.

If the MME generates the corresponding first indication from the first information and transmits the first indication to the E-UTRAN base station at block 604, the E-UTRAN base station may receive the first indication.

At block 606, the E-UTRAN base station triggers the dual connectivity based on the first information or the first indication.

A process for the E-UTRAN base station to trigger the dual connectivity based on the first information is that the E-UTRAN base station as the MN actively initiates addition of the SN based on the first information. If the MME generates the corresponding first indication from the first information and transmits the first indication to the E-UTRAN base station, the E-UTRAN base station determines to trigger the dual connectivity based on the first indication. If the E-UTRAN base station receives the first information, the base station determines whether to trigger the dual connectivity based on the first information.

Figure 7:
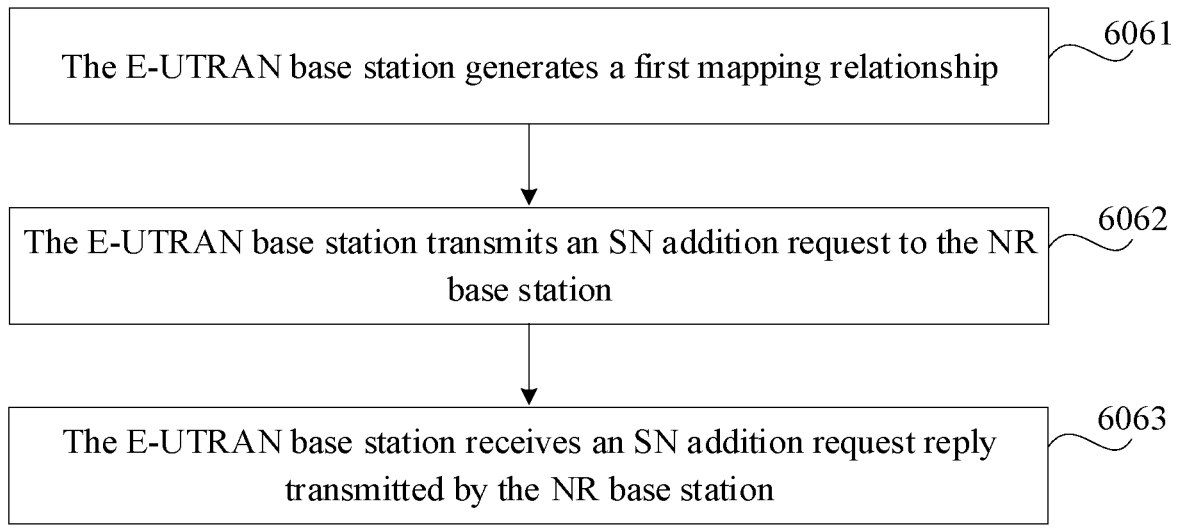
FIG. 7 is a flowchart illustrating a method for an E-UTRAN base station to trigger dual connectivity based on first information according to an embodiment of the present disclosure.

For example, as illustrated in FIG. 7, triggering the dual connectivity by the E-UTRAN base station based on the first information may include the following operations.

At block 6061, the E-UTRAN base station generates a first mapping relationship.

The E-UTRAN base station generates the first mapping relationship based on the received first information or first indication. The first mapping relationship is a correspondence between system-level bearers and Data Radio Bearers (DRBs) associated with the E-UTRAN base station. Since this embodiment of the present disclosure relates to the handover from the 5GS to the EPS, system-level bearers in the second system are system-level bearers of the EPS, that is, EPS Bearers. Therefore, the first mapping relationship is a correspondence (or referred to as a binding relationship) between the EPS Bearers and the DRBs of the E-UTRAN base station. The first mapping relationship may enable a part of the EPS Bearers corresponding to a 5G Quality of Service (QoS) Flow to be bound to the DRBs of the E-UTRAN base station.

At block 6062, the E-UTRAN base station transmits an SN addition request to the NR base station.

The SN addition request may include related parameters of DRB establishment.

At block 6063, the E-UTRAN base station receives an SN addition request reply transmitted by the NR base station.

The SN addition request reply includes a radio resource control (RRC) reconfiguration message of the SN. The RRC reconfiguration message includes a second mapping relationship. The second mapping relationship is a correspondence between system-level bearers and DRBs associated with the NR base station. The second mapping relationship may enable a part of the EPS Bearers corresponding to a 5G QoS Flow to be bound to the DRBs of the NR base station.

For example, the first mapping relationship records that an EPS Bearer 1, an EPS Bearer 2, and an EPS Bearer 3 correspond to a DRB1 and a DRB2 of the E-UTRAN base station, and records that the EPS Bearer 1 is bound to the DRB1 of the E-UTRAN base station, and both the EPS Bearer 2 and the EPS Bearer 3 are bound to the DRB2 of the E-UTRAN base station. The second mapping relationship records that an EPS Bearer 4 and an EPS Bearer 5 correspond to a DRB3 of the NR base station, and records that both the EPS Bearer 4 and the EPS Bearer 5 are bound to the DRB3 of the NR base station.

A correspondence between 5G QoS Flows and 4G EPS Bearers can be transmitted by the 5GC network to the 4G core network during the handover process. During the process of handover of the terminal from the 5GS to the EPS, the EPS Bearer 1, the EPS Bearer 2, and the EPS Bearer 3 may be triggered to be bound to the DRB1 and the DBR2 of the E-UTRAN base station, and the EPS Bearer 4 and the EPS Bearer 5 may be triggered to be bound to the DRB3 of the NR base station. In this way, when receiving the first mapping relationship and the second mapping relationship, the terminal can effectively establish the dual connectivity with the MN base station and the SN base station, and implement data splitting transmission.

It is to be noted that the above embodiment describes only one of processes for the E-UTRAN base station as the MN to actively initiate the addition of the SN based on the first information. In an actual implementation of an embodiment of the present disclosure, adjustment may be made according to practical requirements. For example, the operation at block 6062 may be performed first and then the operation at block 6061 may be performed. Embodiments of the present disclosure are not limiting in this regard.

In this way, in block 606, the dual connectivity information including the first mapping relationship and the second mapping relationship may exist on the E-UTRAN base station.

It is to be noted that, in block 606, when the E-UTRAN base station does not receive an indication prohibiting use of the NR to serve the dual connectivity, the E-UTRAN base station may also trigger the dual connectivity accordingly. That is, by default, the base station may establish the dual connectivity with the terminal, as long as an indication prohibiting the use of the NR to serve the dual connectivity is not received.

At block 607, the E-UTRAN base station transmits the dual connectivity information to an NR-RAN base station.

At block 607, the dual connectivity information may be added by the E-UTRAN base station into a Transparent Container and directly transmitted to the NR-RAN base station.

Of course, in other alternative embodiments, the dual connectivity information may be transmitted to the MME through the E-UTRAN base station. The MME then transmits the dual connectivity information to the AMF. After that, the AMF transmits the dual connectivity information to the NR-RAN base station.

The dual connectivity information may be transmitted by the E-UTRAN base station to the MME through a Handover request ACK. The dual connectivity information may be transmitted by the MME to the AMF through a Relocation response. The dual connectivity information may be transmitted by the AMF to the NR-RAN base station through a Handover command.

In this way, the NR-RAN base station may forward the dual connectivity information to the terminal, so as to enable the terminal to establish the dual connectivity with the MN and the SN in the second system for performing radio interface handover.

Of course, in addition to the dual connectivity information, the NR-RAN base station may also transmit to the terminal other parameters related to the handover operation. The dual connectivity information may be transmitted by the NR-RAN base station to the terminal through the Handover command.

At block 608, the NR-RAN base station transmits the dual connectivity information to the terminal.

At block 609, the terminal receives the dual connectivity information transmitted by the NR-RAN base station.

At block 610, the terminal establishes the dual connectivity with the MN and the SN in the second system based on the dual connectivity information.

That is, the terminal performs handover to the target base station based on the dual connectivity information, and establishes connectivity with the E-UTRAN base station and the NR base station in the second system.

FIG. 8 is a flowchart illustrating a method for system handover according to an embodiment of the present disclosure. The method may be applied to the first system (i.e., the 5GS), the second system (i.e., the EPS), and the terminal in the implementation environment illustrated in FIG. 1. The method describes a process regarding handover of the terminal from the first system to the second system in the method for the system interworking. The method includes the following operations.

At block 801, when the handover operation is triggered, the NG-RAN base station transmits the Handover required message to the AMF.

At block 802, the AMF transmits the first indication to the MME.

The first indication is generated by the AMF based on the first information, and indicates whether the core network element in the EPS allows establishment of the dual connectivity for the terminal.

At block 803, the MME receives the first indication transmitted by the AMF.

At block 804, the MME transmits the first indication to the E-UTRAN base station.

In at least one embodiment, the first indication may be an indication of NR restriction in EPS as secondary RAT. The first indication may be transmitted to the E-UTRAN base station as a sub-parameter of an HRL.

At block 805, the E-UTRAN base station receives the first indication.

At block 806, the E-UTRAN base station triggers the dual connectivity based on the first indication.

At block 807, the E-UTRAN base station transmits the dual connectivity information to the NR-RAN base station.

At block 808, the NR-RAN base station transmits the dual connectivity information to the terminal.

At block 809, the terminal receives the dual connectivity information transmitted by the NR-RAN base station.

At block 810, the terminal establishes the dual connectivity with the MN and the SN in the second system based on the dual connectivity information.

For the related process from block 801 to block 810, reference may be made to the above related process from block 601 to block 610, and thus details thereof will be omitted here.

It is to be noted that in the embodiments of the terminal registration process described in FIG. 3 and FIG. 4, the AMF may transmit the first information or the first indication to the NG-RAN for storage. During the process of handover of the terminal from the first system to the second system, the NG-RAN base station may add the first information or the first indication into a Source to Target Transparent Container, and transparently transmit the first information or the first indication to the E-UTRAN base station. Then, the related process from block 606 to block 610 in the embodiment illustrated in FIG. 6 may be executed, or the related process from block 806 to block 810 in the embodiment illustrated in FIG. 8 may be executed.

Of course, if the NG-RAN base station does not add the first information or the first indication into the Source to Target Transparent Container during the process of handover of the terminal from the first system to the second system, the first information or the first indication may be transmitted, through the handover required message, by the NG-RAN base station to the AMF at block 601 in the embodiment illustrated in FIG. 6 and at block 801 in the embodiment illustrated in FIG. 8. Then, the related process from block 602 to block 610 in the embodiment illustrated in FIG. 6 may be executed, or the related process from block 802 to block 810 in the embodiment illustrated in FIG. 8 may be executed.

In at least one embodiment, in the above block 806, the E-UTRAN base station may add the dual connectivity information including the first mapping relationship and the second mapping relationship into the Source to Target Transparent Container, and return the dual connectivity information including the first mapping relationship and the second mapping relationship to the NR-RAN base station. The NR-RAN base station brings the dual connectivity information including the first mapping relationship and the second mapping relationship to the terminal when triggering the radio interface handover (such as transmitting a handover instruction to the terminal).

In the related art, since the terminal is registered on the 5GS, the terminal will not report a DCNR capability in the 5GS, and thus the 5GS will not bring the DCNR indication to the EPS network element. Therefore, the MME cannot determine whether the terminal supports the DCNR capability, and the MME will not inform the E-UTRAN base station whether the dual connectivity can be performed. That is, in the process of handover from the 5GS to the EPS, all data flows on the 5GS on the terminal will be bound to the E-UTRAN base station of the EPS for transmission. In this way, in the process of handover from the 5GS to the EPS, all data flows that can be handed over need to fall back to the E-UTRAN base station, thereby greatly increasing loads on the E-UTRAN.

In addition, under many circumstances, the handover from the 5GS to the EPS aims to allow services (such as a voice service) that the 5GS cannot support to be performed in the EPS. Therefore, in an embodiment described in the present disclosure, since a part of the data flows is migrated to the E-UTRAN base station (for example, only a bearer corresponding to an IP Multimedia Subsystem (IMS) voice service is handed over to the E-UTRAN base station, while the rest of the data flows is kept on the NR base station connected to the EPC), the loads on the E-UTRAN base station are effectively reduced.

Also, in a practical implementation of an embodiment of the present disclosure, when the terminal initiates an IMS voice request message on the 5GS, the NG-RAN triggers an EPS Fallback scenario of handover from the 5GS to the EPS, based on an establishment request for the voice QoS Flow. In this way, a bearer corresponding to a voice-related data flow may be placed on the E-UTRAN of the EPS, while bearers corresponding to the rest of the data flows may be placed on the NR base station for transmission. Here, the NR base station before and after the handover can be the same one. Since the system handover is performed, context parameters of the NR base station have changed. In this way, it is ensured that in an SA scenario, eMBB data of the user is still guaranteed to be handled with processing capabilities of the NR when the EPS fallback is performed for the voice service.

In summary, with the method for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

Figure 9:
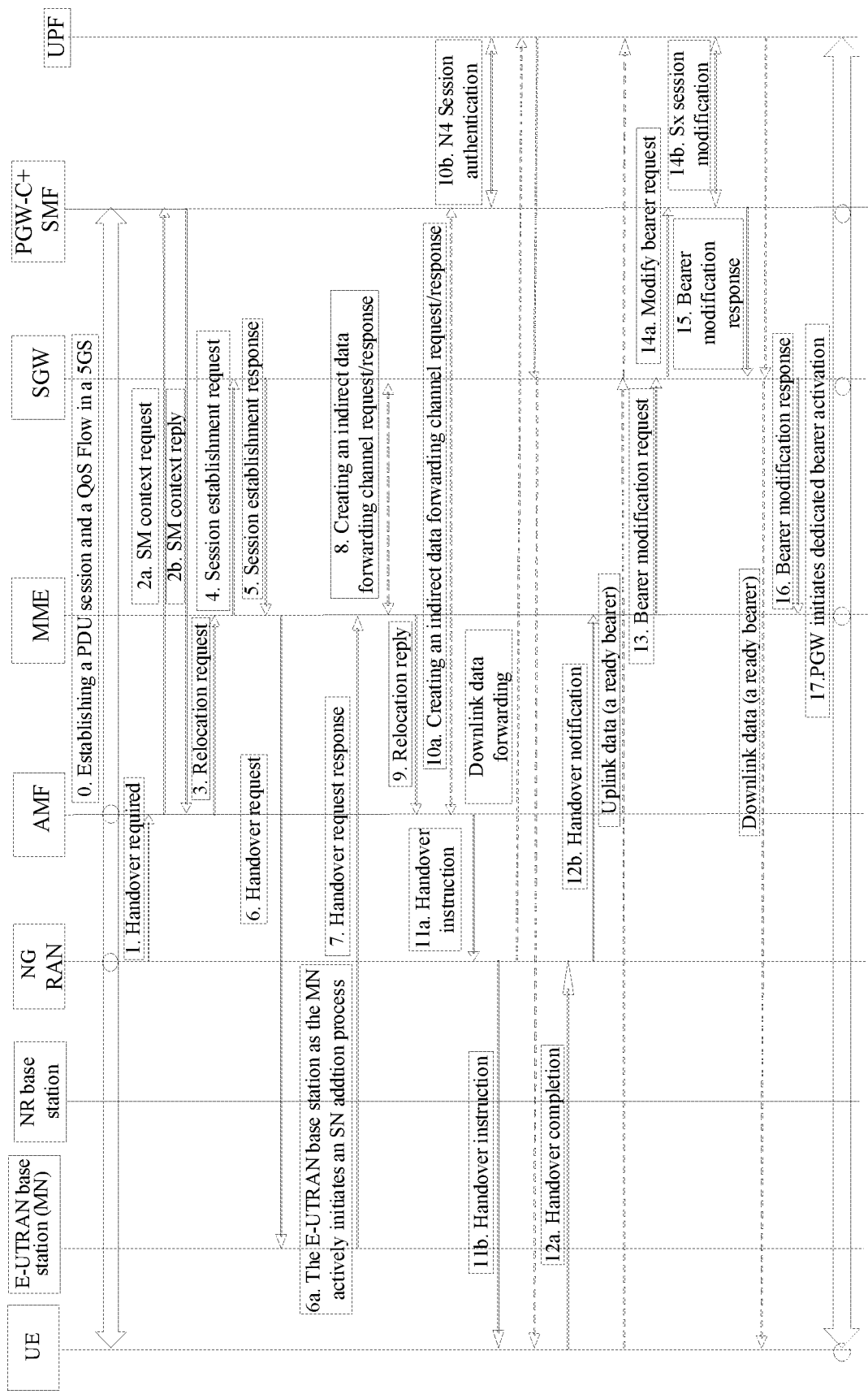
FIG. 9 is a flowchart illustrating a method for system interworking according to an embodiment of the present disclosure.

It is to be noted that, in addition to the operations described in the method for the system interworking illustrated in FIG. 6 and FIG. 8, the handover process may require other operations, such as some of the operations illustrated in FIG. 9. Of course, in a practical implementation of an embodiment of the present disclosure, other network elements may be included in the above first system and second system, and thus the above handover process may also include operations of interacting with the other network elements. Embodiments of the present disclosure are not limiting in this regard.

It is also to be noted that the handover process illustrated in this embodiment of the present disclosure refers to all operations related to the terminal during the handover process. These operations include, but are not limited to, related operations illustrated in FIG. 9, such as that the original base station initiates the Handover required to trigger interaction between the first system and the second system for completing a preparation of the handover, that the terminal receives the Handover command transmitted by the original base station and completes a process of radio interface handover, and that the second system completes data path transfer and bearer establishment after the terminal completes the radio interface handover.

FIG. 9 is a flowchart illustrating a method for system interworking according to an embodiment of the present disclosure. The method may be applied to the 5GS, the EPS, and the terminal in the implementation environment illustrated in FIG. 1. In addition to the MME network element, the EPS further includes the SGW, the UPF network element, and the PGW-C+SMF. The method describes a related process regarding the handover of the terminal from the first system to the second system in the method for the system interworking. The method includes the following operations.

At block 0, a Protocol Data Unit (PDU) session and a QoS Flow in the 5GS are established.

At block 1, the NG-RAN base station transmits a handover request to the AMF.

When the NG-RAN determines that the terminal should be handed-over to the E-UTRAN, a Handover required is transmitted to the AMF. When a first information or a first indication is pre-stored in the NG-RAN base station, then in block 1, the Handover required transmitted by the NG-RAN to the AMF may carry the first information or the first indication.

At block 2a, the AMF transmits a Session Management (SM) context request to the PGW-C+SMF.

At block 2b, the PGW-C+SMF transmits a SM context reply to the AMF.

At block 3, the AMF transmits a Relocation request to the MME.

When the first information or the first indication is pre-stored in the AMF, then in block 3, the Relocation request transmitted by the AMF to the MME may carry the first information or the first indication. For the related process at block 3, reference may be made to the above block 602 and block 802.

At block 4, the MME transmits a session establishment request to the SGW.

At block 5, the SGW transmits a session establishment response to the MME.

At block 6, the MME transmits a handover request to the E-UTRAN base station.

The MME may transmit the handover request to the E-UTRAN base station based on the received first information or first indication. The handover request includes indication information instructing the E-UTRAN base station to trigger the dual connectivity. For the related process, reference may be made to the above block 604 and block 804.

At block 6a, the E-UTRAN base station as the MN actively initiates an SN addition process.

The E-UTRAN base station may generate a first mapping relationship and obtain a second mapping relationship by initiating the SN addition process. For this process, reference may be made to the above block 606 and block 806.

At block 7, the E-UTRAN base station returns a handover request response to the MIME.

The handover request response returned by the E-UTRAN base station to the MME includes the first mapping relationship and the second mapping relationship. Or, the E-UTRAN base station may also add the dual connectivity information of the first mapping relationship and the second mapping relationship into a Source to Target Transparent Container, so as to directly return the dual connectivity information to the NR-RAN base station in subsequent operations.

At block 8, an indirect data forwarding channel request/response is created between the MME and the SGW.

At block 9, the MME returns a Relocation reply to the AMF.

By returning the Relocation reply, the MME transmits the first mapping relationship, the second mapping relationship, and other parameters related to the handover operation to the AMF, such that the first mapping relationship, the second mapping relationship, and other parameters related to the handover operation may be forwarded to the terminal in subsequent processes.

At block 10a, an indirect data forwarding channel request/response is created between the AMF and the PGW-C+SMF.

At block 10b, N4 session authentication is established between the PGW-C+SMF and the UPF.

At block 11a, the AMF transmits a handover instruction to the NG-RAN base station.

The AMF transmits the first mapping relationship, the second mapping relationship, and other parameters related to the handover operation to the NG-RAN base station through the handover instruction, such that the first mapping relationship, the second mapping relationship, and other parameters related to the handover operation may be forwarded to the terminal in subsequent processes.

At block 11b, the NG-RAN base station transmits the handover instruction to the UE.

The NG-RAN base station transmits the first mapping relationship, the second mapping relationship and other parameters related to the handover operation to the terminal through the handover instruction.

At block 12a, the UE returns a handover completion to the NG-RAN base station.

After establishing the dual connectivity with the MN base station and the SN base station based on the first mapping relationship, the second mapping relationship and other parameters related to the handover operation, the terminal returns the handover completion to the NG-RAN base station.

At block 12b, the NG-RAN base station transmits a handover notification to the MME.

At block 13, the MME transmits a bearer modification request to the SGW.

At block 14a, the SGW transmits the bearer modification request to PGW-C+SMF.

At block 14b, Sx session modification is performed between the PGW-C+SMF and the UPF.

At block 15, the PGW-C+SMF transmits a bearer modification response to the SGW.

At block 16, the SGW transmits the bearer modification response to the MME.

At block 17, the PGW initiates dedicated bearer activation.

In summary, with the method for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded. In addition, it can be seen from the flowchart illustrated in FIG. 9 that this process makes full use of an existing procedure and makes little change to the existing system.

FIG. 10 is a flowchart illustrating a method for system interworking according to an embodiment of the present disclosure. The method may be applied to a network-side device connected to the terminal, such as the first core network element in the first system or the second core network element in the second system. The method includes the following operation.

At block 101, the first core network element in the first system or the second core network element in the second system determines whether to establish the dual connectivity between the first base station and the second base station in the second system and the terminal based on the dual connectivity parameter reported by the terminal.

The dual connectivity parameter indicates that the terminal is capable of establishing the dual connectivity with the first base station and the second base station.

In summary, with the method for the system interworking according to an embodiment of the present disclosure, the first core network element in the first system or the second core network element in the second system may determine whether to establish the dual connectivity between the first base station and the second base station in the second system and the terminal based on the dual connectivity parameter reported by the terminal. In this way, data flows on the terminal can be distributed, upon handover between systems, to the MN base station and the SN base station in the second system for transmission, thereby solving a problem in the related art that one base station in the second system is heavily loaded.

It is to be noted that the method for the system interworking according to an embodiment of the present disclosure can not only be used to trigger the dual connectivity, but also can be used to trigger multiple connectivity. For a process of triggering the multiple connectivity, reference may be made to the above related process of triggering the dual connectivity. For example, in the above block 607, the E-UTRAN base station may transmit multiple connectivity information to the NR-RAN base station. The multiple connectivity information may include a number of mapping relationships. Each of the number of mapping relationships includes a correspondence between system-level bearers and DRBs of different base stations, and details thereof will be omitted here.

In at least one embodiment, the dual connectivity parameter is used along with a first parameter in subscription information of the terminal to determine whether to establish the dual connectivity between the first base station and the second base station in the second system and the terminal.

In at least one embodiment, the first core network element in the first system or the second core network element in the second system determines whether to establish the dual connectivity for the terminal at a base station of the second system during an interworking process.

In at least one embodiment, the interworking process is a handover process. Determining, by the first core network element in the first system, whether to establish the dual connectivity for the terminal at the base station of the second system during the handover process includes: receiving, by the first core network element, the dual connectivity parameter transmitted by the terminal, during a registration process of the terminal; and transmitting, by the first core network element, a first indication to the base station of the second system through another network element during a process of handover of the terminal from the first system to the second system, to enable the base station of the second system to trigger the dual connectivity.

In at least one embodiment, the interworking process is a handover process. Determining, by the second core network element in the second system, whether to establish the dual connectivity for the terminal at the base station of the second system during the handover process includes: receiving, by the second core network element, first information transmitted by the first core network element in the first system, and transmitting, by the second core network element, the first information to the base station of the second system, during a process of handover of the terminal from the first system to the second system, to enable the base station of the second system to trigger the dual connectivity.

In at least one embodiment, the interworking process is the handover process. Determining, by the second core network element in the second system, whether to establish the dual connectivity for the terminal at the base station of the second system during the handover process includes: receiving, by the second core network element, the first information transmitted by the first core network element in the first system, during the process of handover of the terminal from the first system to the second system; and generating, by the second core network element, a first indication based on the first information, and transmitting, by the second core network element, the first indication to the base station of the second system, to enable the base station of the second system to trigger the dual connectivity.

In at least one embodiment, the first system is a 5G system, and the second system is an EPS.

In summary, with the method for the system interworking according to an embodiment of the present disclosure, the first core network element in the first system or the second core network element in the second system may determine whether to establish the dual connectivity between the first base station and the second base station in the second system and the terminal based on the dual connectivity parameter reported by the terminal. In this way, data flows on the terminal can be distributed, upon handover between systems, to the MN base station and the SN base station in the second system for transmission, thereby solving a problem in the related art that one base station in the second system is heavily loaded.

For related description of the first core network element in the first system and the second core network element in the second system, reference may be made to the above embodiments, and thus details thereof will be omitted here.

FIG. 11 is a block diagram illustrating an apparatus 100 for system interworking according to an embodiment of the present disclosure. The apparatus 100 includes a transmitting module 101.

The transmitting module 101 is configured to transmit a dual connectivity parameter to a first core network element in a first system during a registration process. The dual connectivity parameter indicates that the terminal is capable of establishing dual connectivity with a first base station and a second base station in a second system.

In summary, with the apparatus for the system interworking according to an embodiment of the present disclosure, the dual connectivity parameter is transmitted to the first core network element in the first system during the registration process. In this way, data flows on the terminal can be distributed, upon handover between systems, to the MN base station and the SN base station in the second system for transmission, thereby solving a problem in the related art that one base station in the second system is heavily loaded.

In at least one embodiment, the dual connectivity parameter is used to trigger the first base station and the second base station in the second system to establish the dual connectivity with the terminal during an interworking process.

In at least one embodiment, the dual connectivity parameter is used along with a first parameter in subscription information of the terminal to determine to trigger the first base station and the second base station in the second system to establish the dual connectivity with the terminal during the interworking process.

In at least one embodiment, the first parameter in the subscription information indicates whether a terminal user is allowed to establish the dual connectivity with the first base station and the second base station in the second system.

In at least one embodiment, the dual connectivity parameter and the first parameter in the subscription information are used for the first system or the second system to determine whether to trigger the first base station and the second base station in the second system to establish the dual connectivity with the terminal.

In at least one embodiment, the dual connectivity parameter and the first parameter in the subscription information are used for the first system to generate and transmit a first indication to the second system, and the first indication is used to enable the second system to determine whether to trigger the first base station and the second base station in the second system to establish the dual connectivity with the terminal.

In at least one embodiment, the dual connectivity parameter and the first parameter in the subscription information are used for the second system to determine whether to trigger the first base station and the second base station in the second system to establish the dual connectivity with the terminal.

In at least one embodiment, the transmitting module 101 is configured to transmit an NAS message to the first core network element in the first system. The NAS message carries the dual connectivity parameter.

In at least one embodiment, the NAS message is a registration request message.

FIG. 12 is a block diagram illustrating another apparatus for system interworking according to an embodiment of the present disclosure. The interworking process is a handover process. The apparatus 100 further includes a receiving module 102 and a processing module 103.

The receiving module 102 is configured to receive dual connectivity information transmitted by the first base station in the second system, during a process of handover from the first system to the second system.

The processing module 103 is configured to establish the dual connectivity with the first base station and the second base station based on the dual connectivity information.

In at least one embodiment, the dual connectivity information includes a first mapping relationship and a second mapping relationship. The first mapping relationship is a correspondence between system-level bearers and DRBs associated with the first base station, and the second mapping relationship is a correspondence between system-level bearers and DRBs associated with the second base station.

In summary, with the apparatus for the system interworking according to an embodiment of the present disclosure, the dual connectivity parameter is transmitted to the first core network element in the first system during the registration process. In this way, data flows on the terminal can be distributed, upon handover between systems, to the MN base station and the SN base station in the second system for transmission, thereby solving a problem in the related art that one base station in the second system is heavily loaded.

Figure 13:
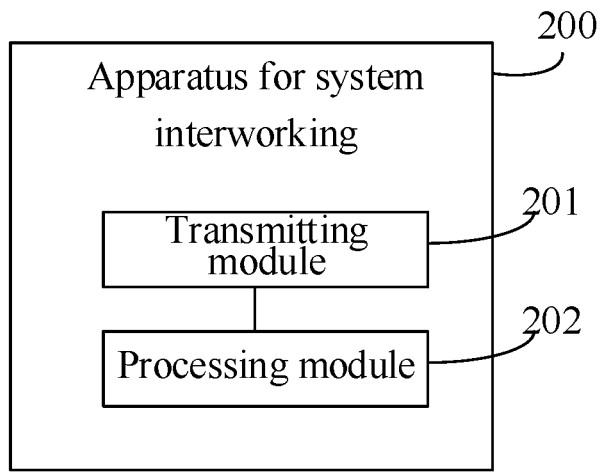
FIG. 13 is a block diagram illustrating another apparatus for system interworking according to an embodiment of the present disclosure.

FIG. 13 is a block diagram illustrating another apparatus 200 for system interworking according to an embodiment of the present disclosure. The apparatus 200 includes a receiving module 201 and a processing module 202.

The receiving module 201 is configured to receive dual connectivity information transmitted by a first base station in a second system, during an interworking process of a first system and the second system.

The processing module 202 is configured to establish dual connectivity with the first base station and a second base station in the second system based on the dual connectivity information.

In summary, with the apparatus for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

In at least one embodiment, the dual connectivity information includes a first mapping relationship and a second mapping relationship. The first mapping relationship is a correspondence between system-level bearers and DRBs associated with the first base station, and the second mapping relationship is a correspondence between system-level bearers and DRBs associated with the second base station.

Figure 14:
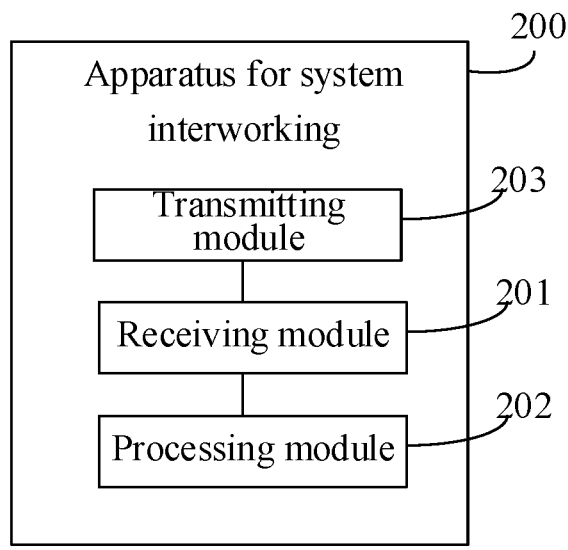
FIG. 14 is a block diagram illustrating another apparatus for system interworking according to an embodiment of the present disclosure.

In at least one embodiment, as illustrated in FIG. 14, the apparatus may further include a transmitting module 203.

The transmitting module 203 is configured to transmit a dual connectivity parameter to a first core network element in the first system during a registration process. The dual connectivity parameter indicates that a terminal is capable of establishing dual connectivity with the first base station and the second base station in the second system.

In at least one embodiment, the dual connectivity parameter is used to trigger the first base station and the second base station in the second system to establish the dual connectivity with the terminal during the interworking process.

In at least one embodiment, the dual connectivity parameter is used along with a first parameter in subscription information of the terminal to determine to trigger the first base station and the second base station in the second system to establish the dual connectivity with the terminal during the interworking process.

In at least one embodiment, the first parameter in the subscription information indicates whether a terminal user is allowed to establish the dual connectivity with the first base station and the second base station in the second system.

In at least one embodiment, the dual connectivity parameter and the first parameter in the subscription information are used for the first system or the second system to determine whether to trigger the first base station and the second base station in the second system to establish the dual connectivity with the terminal.

In at least one embodiment, the dual connectivity parameter and the first parameter in the subscription information are used for the first system to generate and transmit a first indication to the second system, and the first indication is used to enable the second system to determine whether to trigger the first base station and the second base station in the second system to establish the dual connectivity with the terminal.

In at least one embodiment, the dual connectivity parameter and the first parameter in the subscription information are used for the second system to determine whether to trigger the first base station and the second base station in the second system to establish the dual connectivity with the terminal.

In at least one embodiment, the transmitting module 203 is configured to transmit an NAS message to the first core network element in the first system, and the NAS message carries the dual connectivity parameter.

In at least one embodiment, the NAS message is a registration request message.

In at least one embodiment, the interworking process is a handover process.

In at least one embodiment, the first system is a 5G system, and the second system is an EPS.

In summary, with the apparatus for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

Figure 15:
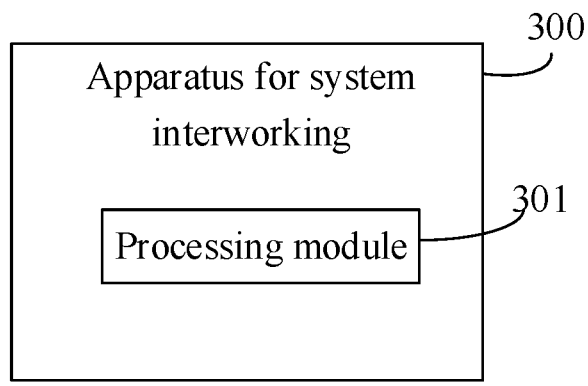
FIG. 15 is a block diagram illustrating another apparatus for system interworking according to an embodiment of the present disclosure.

FIG. 15 is a block diagram illustrating another apparatus 300 for system interworking according to an embodiment of the present disclosure. The apparatus may be applied to a first core network element in a first system or a second core network element in a second system. The apparatus 300 includes a processing module 301.

The processing module 301 is configured to determine whether to establish dual connectivity between a first base station and a second base station in the second system and a terminal based on a dual connectivity parameter reported by the terminal. The dual connectivity parameter indicates that the terminal is capable of establishing the dual connectivity with the first base station and the second base station.

In summary, with the apparatus for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

In at least one embodiment, the dual connectivity parameter is used along with a first parameter in subscription information of the terminal to determine whether to establish the dual connectivity between the first base station and the second base station in the second system and the terminal.

In at least one embodiment, the processing module 301 is configured to determine whether to establish the dual connectivity for the terminal at a base station of the second system during a handover process.

In at least one embodiment, the interworking process is a handover process. The apparatus is applied to the first core network element. The processing module 301 is configured to: receive the dual connectivity parameter transmitted by the terminal, during a registration process of the terminal; and transmit a first indication to the base station of the second system through another network element during a process of handover of the terminal from the first system to the second system, to enable the base station of the second system to trigger the dual connectivity.

In at least one embodiment, the interworking process is a handover process. The apparatus is applied to the second core network element. The processing module 301 is configured to: receive first information transmitted by the first core network element in the first system, and transmit the first information to the base station of the second system, during a process of handover of the terminal from the first system to the second system, to enable the base station of the second system to trigger the dual connectivity.

In at least one embodiment, the interworking process is the handover process. The apparatus is applied to the second core network element. The processing module 301 is configured to: receive the first information transmitted by the first core network element in the first system during the process of handover of the terminal from the first system to the second system; and generate a first indication based on the first information, and transmit the first indication to the base station of the second system, to enable the base station of the second system to trigger the dual connectivity.

In at least one embodiment, the first system is a 5G system, and the second system is an EPS.

In summary, with the apparatus for the system interworking according to an embodiment of the present disclosure, the terminal may establish the dual connectivity with the MN base station and the SN base station in the second system during the process of handover of the terminal from the first system to the second system. In this way, data flows on the terminal can be distributed, upon handover between systems, to the MN base station and the SN base station in the second system for transmission, thereby solving a problem in the related art that one base station in the second system is heavily loaded.

Figure 16:
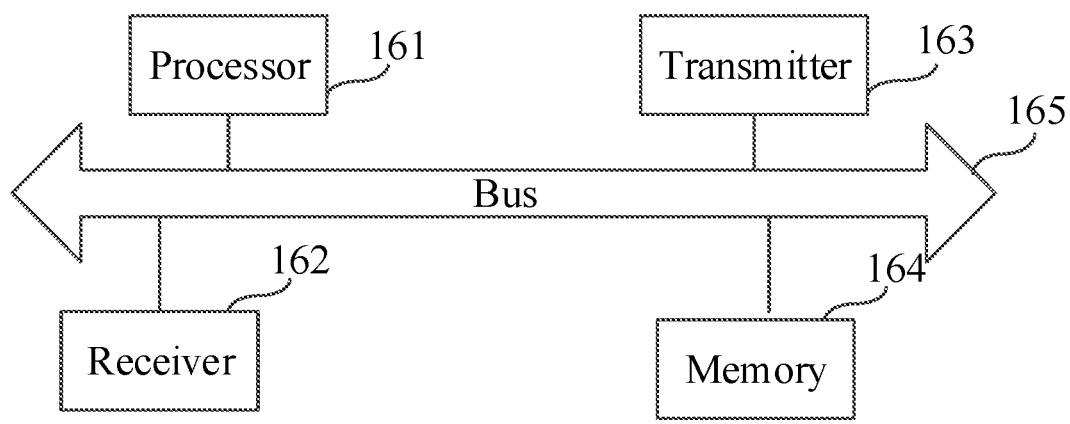
FIG. 16 is a block diagram illustrating a structure of a terminal according to an embodiment of the present disclosure.

FIG. 16 is a block diagram illustrating a structure of a terminal according to an embodiment of the present disclosure. Referring to FIG. 16, the terminal includes a processor 161, a receiver 162, a transmitter 163, a memory 164, and a bus 165.

The processor 161 includes one or more processing cores. The processor 161 executes various functional applications and information processing by operating software programs and modules.

The receiver 162 and the transmitter 163 may be implemented as a communication component. The communication component may be a communication chip. The communication chip may include a receiving module, a transmitting module, a modem module, etc., which are configured to modulate and/or demodulate information, and to receive or transmit the information via wireless signals.

The memory 164 is connected to the processor 161 through the bus 165.

The memory 164 may be configured to store at least one instruction. The processor 161 is configured to execute the at least one instruction to implement each operation in the above method embodiments.

In addition, the memory 164 can be implemented by any type of volatile or non-volatile storage device or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The terminal may be the terminal involved in the above embodiments.

Figure 17:
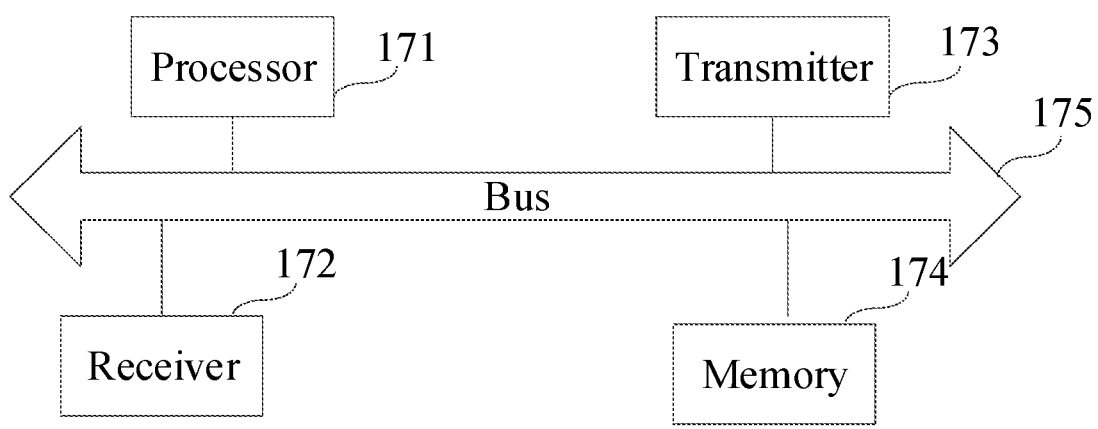
FIG. 17 is a block diagram illustrating a structure of a network-side device according to an embodiment of the present disclosure.

FIG. 17 is a block diagram illustrating a structure of a network-side device according to an embodiment of the present disclosure. Referring to FIG. 17, the network-side device includes a processor 171, a receiver 172, a transmitter 173, a memory 174, and a bus 175.

The processor 171 includes one or more processing cores. The processor 171 executes various functional applications and information processing by operating software programs and modules.

The receiver 172 and the transmitter 173 may be implemented as a communication component. The communication component may be a communication chip. The communication chip may include a receiving module, a transmitting module, a modem module, etc., which are configured to modulate and/or demodulate information, and to receive or transmit the information via wireless signals.

The memory 174 is connected to the processor 171 through the bus 175.

The memory 174 may be configured to store at least one instruction. The processor 171 is configured to execute the at least one instruction to implement each operation in the above method embodiments.

In addition, the memory 174 can be implemented by any type of volatile or non-volatile storage device or a combination thereof, such as an SRAM, an EEPROM, an EPROM, a PROM, a ROM, a magnetic memory, a flash memory, a magnetic disk or an optical disk.

The present disclosure provides a computer-readable storage medium storing at least one instruction. The at least one instruction is configured to be loaded and executed by a processor to implement the method for the system interworking according to the above method embodiments.

The present disclosure further provides a computer program product. When the computer program product runs on a computer, the computer is caused to implement the method for the system interworking according to the above method embodiments.

The present disclosure provides a chip including a programmable logic circuit and/or a program instruction configured to implement the method for the system interworking according to the above method embodiments when the chip is operating.

A person skilled in the art can understand that all or part of the operations in the above embodiments can be implemented by hardware, or by a program instructing relevant hardware. The program can be stored in a computer-readable storage medium. The storage medium mentioned above can be a read-only memory, a magnetic disk or an optical disk, etc.

The above description merely illustrates embodiments of the present disclosure and is not intended to limit the present disclosure. Any modification, equivalent replacement, improvement, and the like made within the spirit and principle of the present disclosure shall be included in the scope of the present disclosure.

What is claimed is:

1. A method for system interworking, comprising:
receiving, by a terminal, dual connectivity information transmitted by a first base station in a second system, during an interworking process of handover from a first system to the second system; and
establishing, by the terminal, dual connectivity with the first base station and a second base station in the second system based on the dual connectivity information;
wherein said first system is a 5th-Generation New Radio (5G NR), and said second system is a 4th-Generation Evolved Packet System (4G EPS),
wherein the dual connectivity information comprises a first mapping relationship and a second mapping relationship; and
the first mapping relationship is a correspondence between system-level bearers and Data Radio Bearers (DRBs) associated with the first base station, and the second mapping relationship is a correspondence between system-level bearers and DRBs associated with the second base station.

2. The method according to claim 1, wherein the dual connectivity information is added by the first base station into a Transparent Container and directly transmitted to the terminal's serving base station in the first system, and is forwarded to the terminal by the terminal's serving base station in the first system.

3. The method according to claim 1, further comprising:
transmitting, by the terminal, a dual connectivity parameter to a first core network element in the first system during a registration process, wherein the dual connectivity parameter indicates that the terminal is capable of establishing dual connectivity with the first base station and the second base station in the second system.

4. The method according to claim 3, wherein the dual connectivity parameter is used to trigger the first base station and the second base station in the second system to establish the dual connectivity with the terminal during the interworking process.

5. The method according to claim 4, wherein the dual connectivity parameter is used along with a first parameter in subscription information of the terminal to determine to trigger the first base station and the second base station in the second system to establish the dual connectivity with the terminal during the interworking process.

6. The method according to claim 5, wherein
the first parameter in the subscription information indicates whether a terminal user is allowed to use NR or whether to allow the use of dual connectivity,
a first indication is generated by the first core network element based on the dual connectivity parameter and/or the subscription information, and is an indication of NR restriction in EPS as secondary Radio Access Technology (RAT), and
the first indication is carried in a Relocation request transmitted by the first core network element to a second core network element in the second system.

7. A method for system interworking, comprising:
determining, by a first core network element in a first system or a second core network element in a second system, to establish dual connectivity between a first base station and a second base station in the second system and a terminal based on a dual connectivity parameter reported by the terminal,
wherein the dual connectivity parameter indicates that the terminal is capable of establishing the dual connectivity with the first base station and the second base station, and
said first system is a 5G NR, and said second system is a 4G EPS,
wherein the dual connectivity parameter is used along with a first parameter in subscription information of the terminal to determine to establish the dual connectivity between the first base station and the second base station in the second system and the terminal,
wherein the interworking process is a handover process, and
determining, by the first core network element in the first system, to establish the dual connectivity for the terminal at the base station of the second system during the handover process comprises: receiving, by the first core network element, the dual connectivity parameter transmitted by the terminal, during a registration process of the terminal; and transmitting, by the first core network element, a first indication to the base station of the second system through another network element, during a process of handover of the terminal from the first system to the second system, to enable the base station of the second system to trigger the dual connectivity, or
determining, by the second core network element in the second system, to establish the dual connectivity for the terminal at the base station of the second system during the handover process comprises:
receiving, by the second core network element, first information transmitted by the first core network element in the first system, and transmitting, by the second core network element, the first information to the base station of the second system, during a process of handover of the terminal from the first system to the second system, to enable the base station of the second system to trigger the dual connectivity.

8. The method according to claim 7, wherein the dual connectivity parameter is used along with a first parameter in subscription information of the terminal to determine to establish the dual connectivity between the first base station and the second base station in the second system and the terminal.

9. The method according to claim 7, wherein the interworking process is the handover process, and determining, by the second core network element in the second system, to establish the dual connectivity for the terminal at the base station of the second system during the handover process comprises:
receiving, by the second core network element, the first information transmitted by the first core network element in the first system, during the process of handover of the terminal from the first system to the second system; and
generating, by the second core network element, a first indication based on the first information, and transmitting, by the second core network element, the first indication to the base station of the second system, to enable the base station of the second system to trigger the dual connectivity.

10. An apparatus for system interworking, comprising a processor and a memory, wherein the memory stores at least one instruction which, when executed by the processor, causes the processor to perform operations comprising:
receiving dual connectivity information transmitted by a first base station in a second system, during an interworking process of handover from a first system to the second system; and
establishing dual connectivity with the first base station and a second base station in the second system based on the dual connectivity information,
wherein said first system is a 5G NR, and said second system is a 4G EPS,
wherein the dual connectivity information comprises a first mapping relationship and a second mapping relationship; and
the first mapping relationship is a correspondence between system-level bearers and Data Radio Bearers (DRBs) associated with the first base station, and the second mapping relationship is a correspondence between system-level bearers and DRBs associated with the second base station.

11. The apparatus according to claim 10, wherein the dual connectivity information is added by the first base station into a Transparent Container and directly transmitted to the terminal's serving base station in the first system, and is forwarded to the terminal by the terminal's serving base station in the first system.

12. The apparatus according to claim 10, the operations performed by the processor further comprising:
transmitting a dual connectivity parameter to a first core network element in the first system during a registration process, wherein the dual connectivity parameter indicates that a terminal is capable of establishing dual connectivity with the first base station and the second base station in the second system.

13. The apparatus according to claim 12, wherein the dual connectivity parameter is used to trigger the first base station and the second base station in the second system to establish the dual connectivity with the terminal during the interworking process.

14. The apparatus according to claim 12, wherein the dual connectivity parameter is used along with a first parameter in subscription information of the terminal to determine to trigger the first base station and the second base station in the second system to establish the dual connectivity with the terminal during the interworking process.

15. The apparatus according to claim 14, wherein
the first parameter in the subscription information indicates whether a terminal user is allowed to use NR or whether to allow the use of dual connectivity,
a first indication is generated by the first core network element based on the dual connectivity parameter and/or the subscription information, and is an indication of NR restriction in EPS as secondary Radio Access Technology (RAT), and
the first indication is carried in a Relocation request transmitted by the first core network element to a second core network element in the second system.

* * * * *